(12) United States Patent
Ishida et al.

(10) Patent No.: US 8,268,503 B2
(45) Date of Patent: Sep. 18, 2012

(54) FUEL CELL STACK

(75) Inventors: Kentaro Ishida, Shioya-gun (JP); Seiji Sugiura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1136 days.

(21) Appl. No.: 11/789,879

(22) Filed: Apr. 26, 2007

(65) Prior Publication Data

US 2007/0254203 A1    Nov. 1, 2007

(30) Foreign Application Priority Data

Apr. 28, 2006  (JP) .................. 2006-126355

(51) Int. Cl.
*H01M 2/38* (2006.01)
*H01M 2/40* (2006.01)
*H01M 8/24* (2006.01)
*H01M 8/04* (2006.01)

(52) U.S. Cl. .................. 429/457; 429/458; 429/514

(58) Field of Classification Search .................. 429/457, 429/458, 514
See application file for complete search history.

(56) References Cited

U.S. PATENT DOCUMENTS

2005/0095474 A1*  5/2005  Rainville ................. 429/22
2005/0277013 A1*  12/2005  Yamaga et al. .......... 429/38

FOREIGN PATENT DOCUMENTS

JP       2003-077497       3/2003

* cited by examiner

*Primary Examiner* — Eugenia Wang
(74) *Attorney, Agent, or Firm* — Nelson Mullins Riley & Scarborough LLP; Anthony A. Laurentano

(57) ABSTRACT

In a fuel cell module, a first membrane electrode assembly is sandwiched between a first metal separator and a second metal separator, and a second membrane electrode assembly is sandwiched between the second metal separator and the third metal separator. An oxygen-containing gas distribution section connected to a first oxygen-containing gas flow field is formed between the first metal separator and the second metal separator. The second metal separator has holes connecting the oxygen-containing gas distribution section to a second oxygen-containing gas flow field.

4 Claims, 17 Drawing Sheets

(Prior Art)

FUEL CELL STACK

BACKGROUND OF THE INVENTION

1. Field of the Invention

The present invention relates to a fuel cell stack formed by stacking a first electrolyte assembly and a second electrolyte electrode assembly and separators alternately in a stacking direction. Each of the first electrolyte electrode assembly and the second electrolyte electrode assembly comprises a pair of electrodes and an electrolyte interposed between the electrodes. One reactant gas passage as a passage of one reactant gas and another reactant passage as a passage of another reactant gas extend through the separators in the stacking direction.

2. Description of the Related Art

For example, a polymer electrolyte fuel cell employs a membrane electrode assembly which includes an anode, a cathode, and an electrolyte membrane (electrolyte) interposed between the anode and the cathode. The electrolyte membrane is a polymer ion exchange membrane. The membrane electrode assembly is sandwiched between a pair of separators. The membrane electrode assembly and the separators make up a power generation cell for generating electricity. In practical use, generally, a predetermined number of power generation cells are stacked together to form a fuel cell stack.

In the fuel cell stack, a fuel gas flow field (reactant gas flow field) for supplying a fuel gas (reactant gas) to the anode and an oxygen-containing gas flow field (reactant gas flow field) for supplying an oxygen-containing gas (reactant gas) to the cathode are provided. Further, as necessary, a coolant flow field is provided between the separators for supplying a coolant along the surfaces of the separators.

In general, the fuel cells adopt, so-called, internal manifold structure in which fluid supply passages and fluid discharge passages extend through the separators in the stacking direction. The fluids, i.e., the fuel gas, the oxygen-containing gas, and the coolant are supplied from the respective fluid supply passages to the fuel gas flow field, the oxygen-containing gas flow field, and the coolant flow field, and then, discharged into the respective fluid discharge passages.

In order to perform the power generation efficiently, the fuel gas and the oxygen-containing gas need to be suitably supplied to the entire power generation surfaces. Each of the fuel gas flow field and the oxygen-containing gas flow field has a large number of flow grooves over the entire power generation surface. The opening area of the fluid supply passage is considerably small in comparison with that of the fluid grooves. In the structure, it is extremely difficult to uniformly supply the fuel gas and the oxygen-containing gas from the fluid supply passages to the respective flow grooves.

In this regard, a separator for a fuel cell disclosed in Japanese Laid-Open Patent Publication No. 2003-77497 is known. As shown in FIG. 17, the separator 1 has ridges (protrusions) 2 to 6 on a surface facing an anode (not shown). The ridge 2 is formed along the edge of the separator 1, and positioned outside the fuel gas inlet 7. The fuel gas flows through an area hemmed by the ridge 2.

An inlet section 8 as part of a serpentine fuel gas flow field is provided on a surface of the separator 1. Square protrusions 3 are provided at equal intervals laterally and longitudinally to form flow grooves 9 in a grid pattern as a whole. The inlet section 8 includes an expansion 8a having a width larger than that of the flow field at the fuel gas inlet 7.

Three strip-shaped ridges 4, 5, 6 are formed in the inlet section 8. The ridges 4, 5, 6 are formed on the upstream side, adjacent to the fuel gas inlet 7, and extend in parallel toward the downstream side. Then the ridges 4, 5 are turned upwardly in a zigzag pattern, and the ridge 6 is turned downwardly in a zigzag pattern. According to the disclosed structure, the fuel gas supplied from the fuel gas inlet 7 to the inlet section 8 flows uniformly over the entire inlet section 8 by the guidance of the ridges 4 to 6.

However, in the conventional technique, the inlet section 8 is provided on one surface of the separator 1, and another inlet section 8 is provided on the other surface of the separator 1. Therefore, in order to reduce the thickness of the separator 1, since each of the inlet sections 8 should be short in the height direction, the flow grooves 9 may not have sufficient depth, and thus, the pressure loss is large. In particular, in the case of adopting metal separators, since the flow fields are formed on both front and back surfaces of the separator (the grooves on one surface form the ridges (protrusions) on the other surface), the separator cannot be designed freely.

SUMMARY OF THE INVENTION

A main object of the present invention is provide a fuel cell stack in which the thickness in a stacking direction is reduced, the sufficient flow field height is achieved, the pressure loss is suppressed, and the power generation can be performed efficiently.

The present invention relates to a fuel cell stack formed by stacking a first electrolyte electrode assembly and a second electrolyte electrode assembly and separators alternately in a stacking direction. Each of the first electrolyte electrode assembly and the second electrolyte electrode assembly comprises a pair of electrodes and an electrolyte interposed between the electrodes. One reactant gas passage as a passage of one reactant gas and another reactant passage as a passage of another reactant gas which is different from the one reactant gas extend through the separators in the stacking direction.

The fuel cell stack comprises a first reactant gas flow field for supplying the one reactant gas along an electrode surface of the first electrolyte electrode assembly, and a second reactant gas flow field for supplying the one reactant gas along an electrode surface of the second electrolyte electrode assembly. A reactant gas distribution section connecting the first reactant gas flow field to the one reactant gas passage is formed between adjacent separators sandwiching the first electrolyte electrode assembly, and the separator adjacent to the second electrolyte electrode assembly has an opening for passing the one reactant gas therethrough such that the second reactant gas flow field is connected to the reactant gas distribution section.

Further, the present invention relates to a fuel cell stack formed by sandwiching a first electrolyte electrode assembly between a first separator and a second separator, and sandwiching a second electrolyte electrode assembly between the second separator and a third separator. Each of the first electrolyte electrode assembly and the second electrolyte electrode assembly comprises a pair of electrodes and an electrolyte interposed between the electrodes. One reactant gas passage as a passage of one first reactant gas and another reactant passage as a passage of another reactant gas which is different from the first reactant gas extend through the separators in a stacking direction.

The fuel cell stack comprises a first reactant gas flow field and a second reactant gas flow field provided between the first separator and one electrode of the first electrolyte electrode assembly, and between the second separator and one electrode of the second electrolyte electrode assembly for supplying the one reactant gas along electrode surfaces, and a third reactant gas flow field and a fourth reactant gas flow field provided between the second separator and the other electrode of the first electrolyte electrode assembly, and between the third separator and the other electrode of the second electrolyte electrode assembly for supplying the other reactant gas along electrode surfaces.

A reactant gas distribution section connecting the one reactant gas passage to the first reactant flow field is formed between the first separator and the second separator, and the second separator has an opening for passing the one reactant gas therethrough such that the reactant gas distribution section is connected to the second reactant gas flow field.

Further, the present invention relates to a fuel cell stack formed by stacking a first fuel cell and a second fuel cell in a stacking direction. The first fuel cell includes a first electrolyte electrode assembly and a first separator and a second separator sandwiching the first electrolyte electrode assembly. The second fuel cell includes a second electrolyte electrode assembly and a third separator and a fourth separator sandwiching the second electrolyte electrode assembly. Each of the first electrolyte electrode assembly and the second electrolyte electrode assembly comprises a pair of electrodes, and an electrolyte interposed between the electrodes. One reactant gas passage as a passage of one reactant gas and another reactant passage as a passage of another reactant gas which is different from the one reactant gas extend through the fuel cell stack in the stacking direction.

The fuel cell stack comprises a first reactant gas flow field and a second reactant gas flow field provided between the first separator and one electrode of the first electrolyte electrode assembly, and between the third separator and one electrode of the second electrolyte electrode assembly for supplying the one reactant gas along electrode surfaces, and a third reactant gas flow field and a fourth reactant gas flow field provided between the second separator and the other electrode of the first electrolyte electrode assembly, and between the fourth separator and the other electrode of the second electrolyte electrode assembly for supplying the other reactant gas along electrode surfaces.

A reactant gas distribution section connecting the one reactant gas passage to the first reactant gas flow field is formed between the first separator and the second separator, and each of the second separator and the third separator has an opening for passing the one reactant gas therethrough such that the reactant gas distribution section is connected to the second reactant gas flow field.

According to the present invention, the one reactant gas flows into the reactant gas distribution section formed between the separators. The one reactant gas is partially supplied into the first reactant gas flow field of the first electrolyte electrode assembly, and the rest of the one reactant gas flows through the opening of the separator to the second reactant gas flow field of the second electrolyte electrode assembly.

Thus, before the reactant gas is supplied to the first reactant gas flow field and the second reactant gas flow field, the reactant gas is temporarily supplied from the one reactant gas passage to the same reactant gas distribution section. In the structure, while reducing the dimension in the stacking direction, it is possible to achieve the sufficient flow field height of the reactant gas distribution section. Thus, the structure for distributing the reactant gas can be designed freely to a greater extent, and the pressure loss in the reactant gas distribution section is suppressed suitably.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
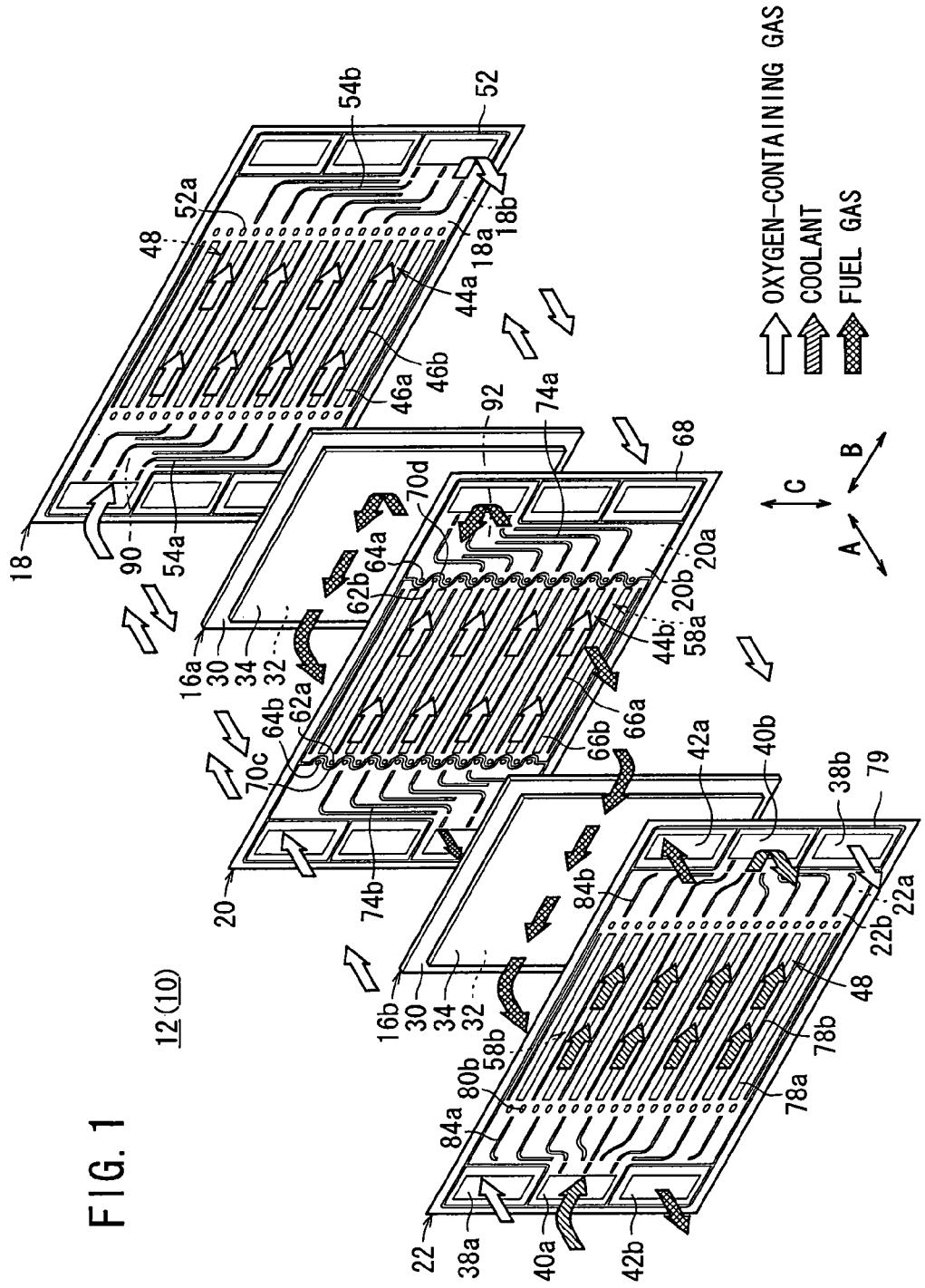
FIG. 1 is an exploded perspective view showing main components of a fuel cell stack according to a first embodiment of the present invention.
Figure 2:
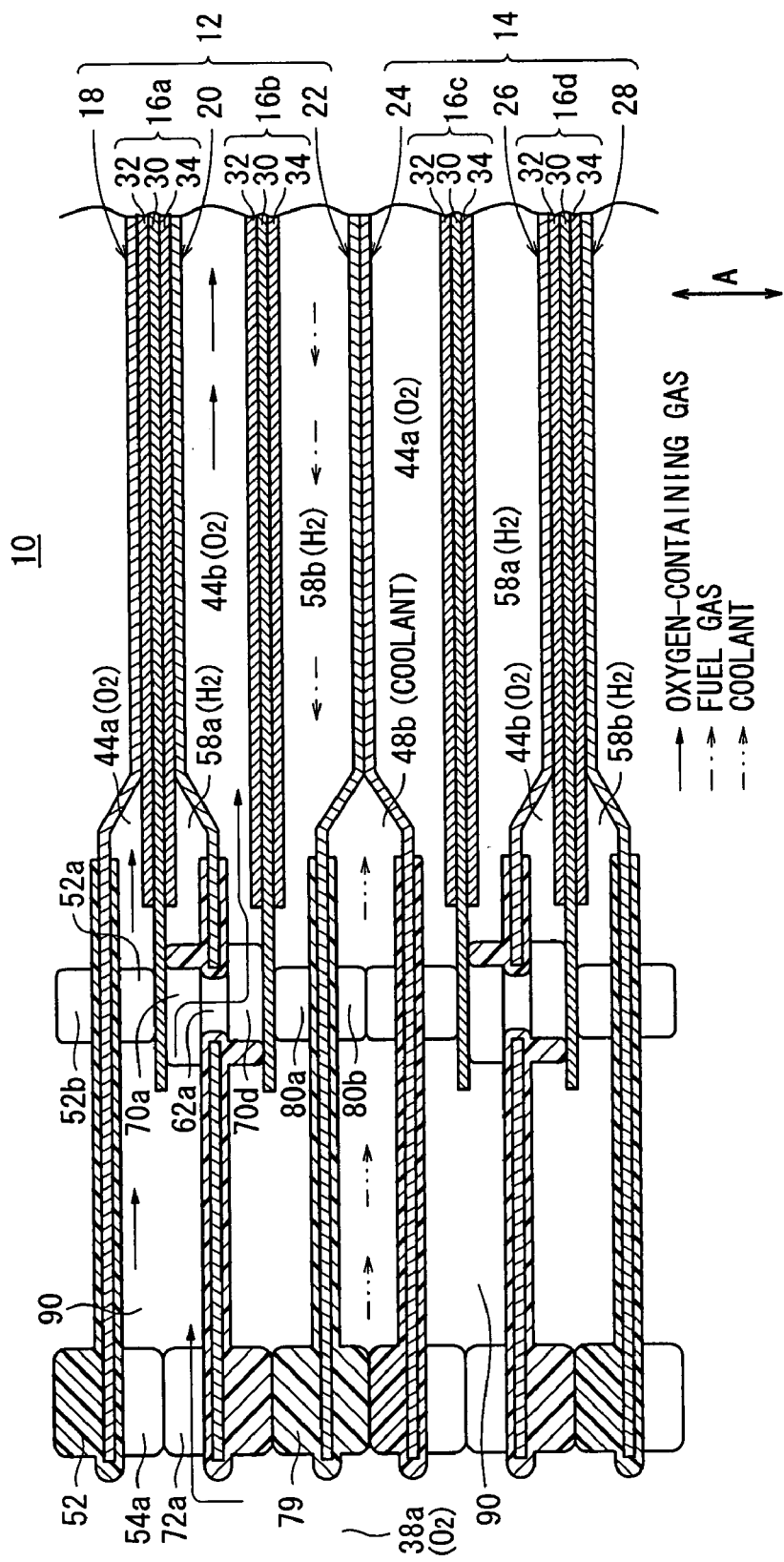
FIG. 2 is a partial cross sectional view showing the fuel cell stack.

FIG. 1 is an exploded perspective view showing main components of a fuel cell stack 10 according to a first embodiment of the present invention. FIG. 2 is a partial cross sectional view showing the fuel cell stack 10.

The fuel cell stack 10 is formed by stacking first cell modules 12 and second cell modules 14 alternately in a direction indicated by an arrow A (see FIG. 2). For example, the fuel cell stack 10 is mounted in a vehicle such as an automobile.

The first cell module 12 includes a first membrane electrode assembly (electrolyte electrode assembly) 16a, a second membrane electrode assembly 16b, and first to third metal separators 18, 20, 22. The first membrane electrode assembly 16a is sandwiched between the first and second metal separators 18, 20, and the second membrane electrode assembly 16b is sandwiched between the second and the third metal separators 20, 22. The second cell module 14 includes a third membrane electrode assembly 16c, a fourth membrane electrode assembly 16d, and fourth to sixth metal separators 24, 26, 28. The third membrane electrode assembly 16c is sandwiched between the fourth and fifth metal separators 24, 26, and the fourth membrane electrode assembly 16d is sandwiched between the fifth and sixth metal separators 26, 28. Instead of using the first metal separator 18 to the sixth metal separator 28, for example, carbon separators (not shown) may be used.

The second cell module 14 has substantially identical structure to that of the first cell module 12. Hereinafter, the first cell module 12 will be described in detail. The constituent elements of the second cell module 14 that are identical to those of the first cell module 12 are labeled with the same reference numerals, and detailed description will be omitted.

As shown in FIGS. 1 and 2, each of the first and second membrane electrode assemblies 16a, 16b comprises a cathode 32, an anode 34, and a solid polymer electrolyte membrane 30 interposed between the cathode 32 and the anode 34. The solid polymer electrolyte membrane 30 is formed by impregnating a thin membrane of perfluorosulfonic acid with water, for example.

Each of the cathode 32 and the anode 34 has a gas diffusion layer such as a carbon paper, and an electrode catalyst layer of platinum alloy supported on porous carbon particles. The carbon particles are deposited uniformly on the surface of the gas diffusion layer. The electrode catalyst layer of the cathode 32 and the electrode catalyst layer of the anode 34 are fixed to both surfaces of the solid polymer electrolyte membrane 30, respectively.

As shown in FIG. 1, at one end of the first cell module 12 in a direction indicated by an arrow B, an oxygen-containing gas supply passage (a reactant gas passage) 38a for supplying an oxygen-containing gas such as the air, a coolant supply passage 40a for supplying a coolant such as pure water or ethylene glycol, and a fuel gas discharge passage 42b for discharging a fuel gas such as a hydrogen-containing gas are provided. The oxygen-containing gas supply passage 38a, the coolant supply passage 40a, and the fuel gas discharge passage 42b extend through the first cell module 12 in the direction indicated by the arrow A.

At the other end of the first cell module 12 in the direction indicated by the arrow B, a fuel gas supply passage (another reactant gas passage) 42a for supplying the fuel gas, a coolant discharge passage 40b for discharging the coolant, and an oxygen-containing gas discharge passage 38b for discharging the oxygen-containing gas are provided. The fuel gas supply passage 42a, the coolant discharge passage 40b, and the oxygen-containing gas discharge passage 38b extend through the first cell module 12 in the direction indicated by the arrow A.

Figure 3:
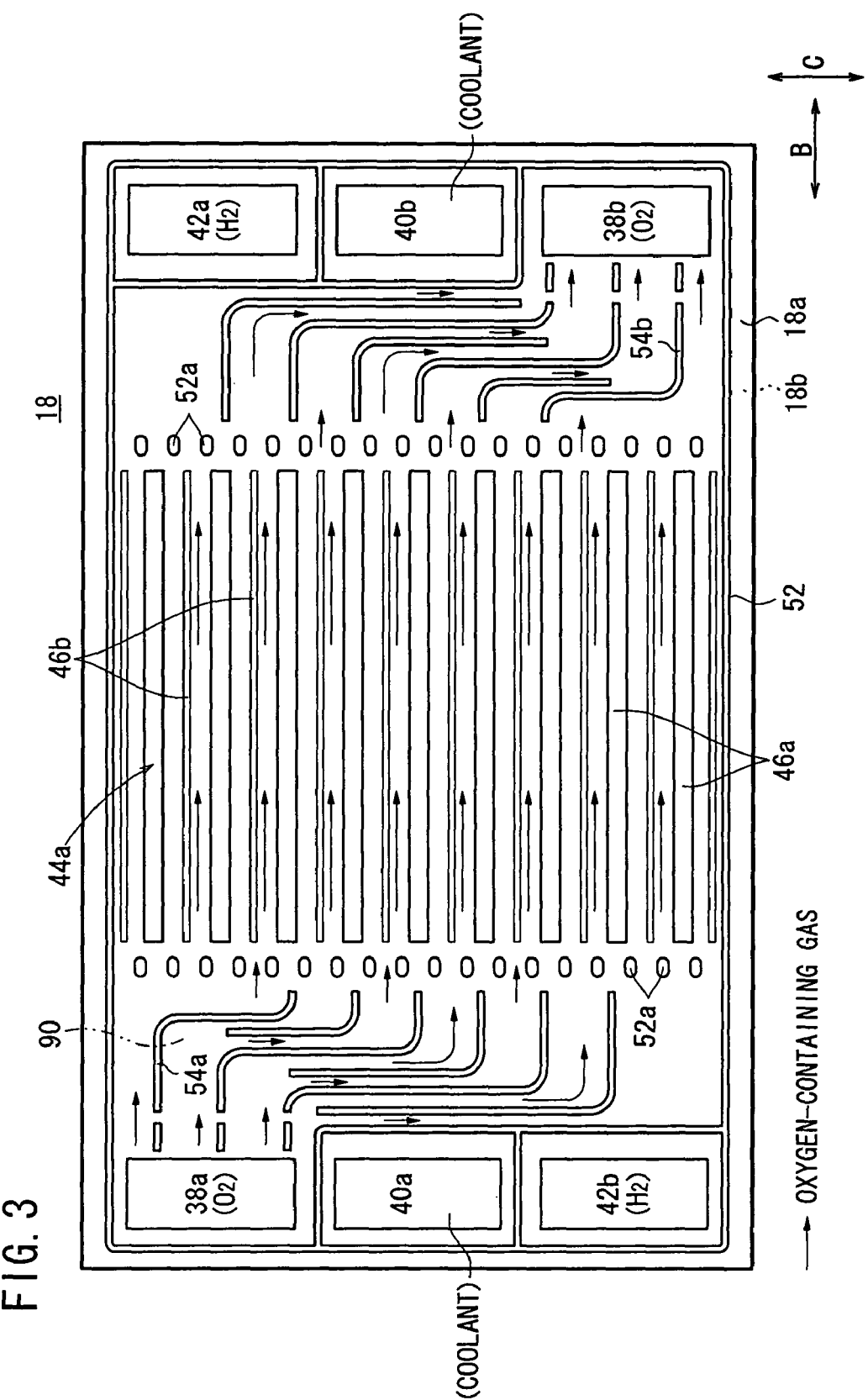
FIG. 3 is a view showing one surface of a first metal separator of the fuel cell stack.

As shown in FIG. 3, the first metal separator 18 has a first oxygen-containing gas flow field (first reactant gas flow field) 44a on a surface 18a facing the first membrane electrode assembly 16a. The first oxygen-containing gas flow field 44a comprises a plurality of straight flow grooves 46b between a plurality of straight ridges 46a formed by corrugating the first metal separator 18.

Figure 4:
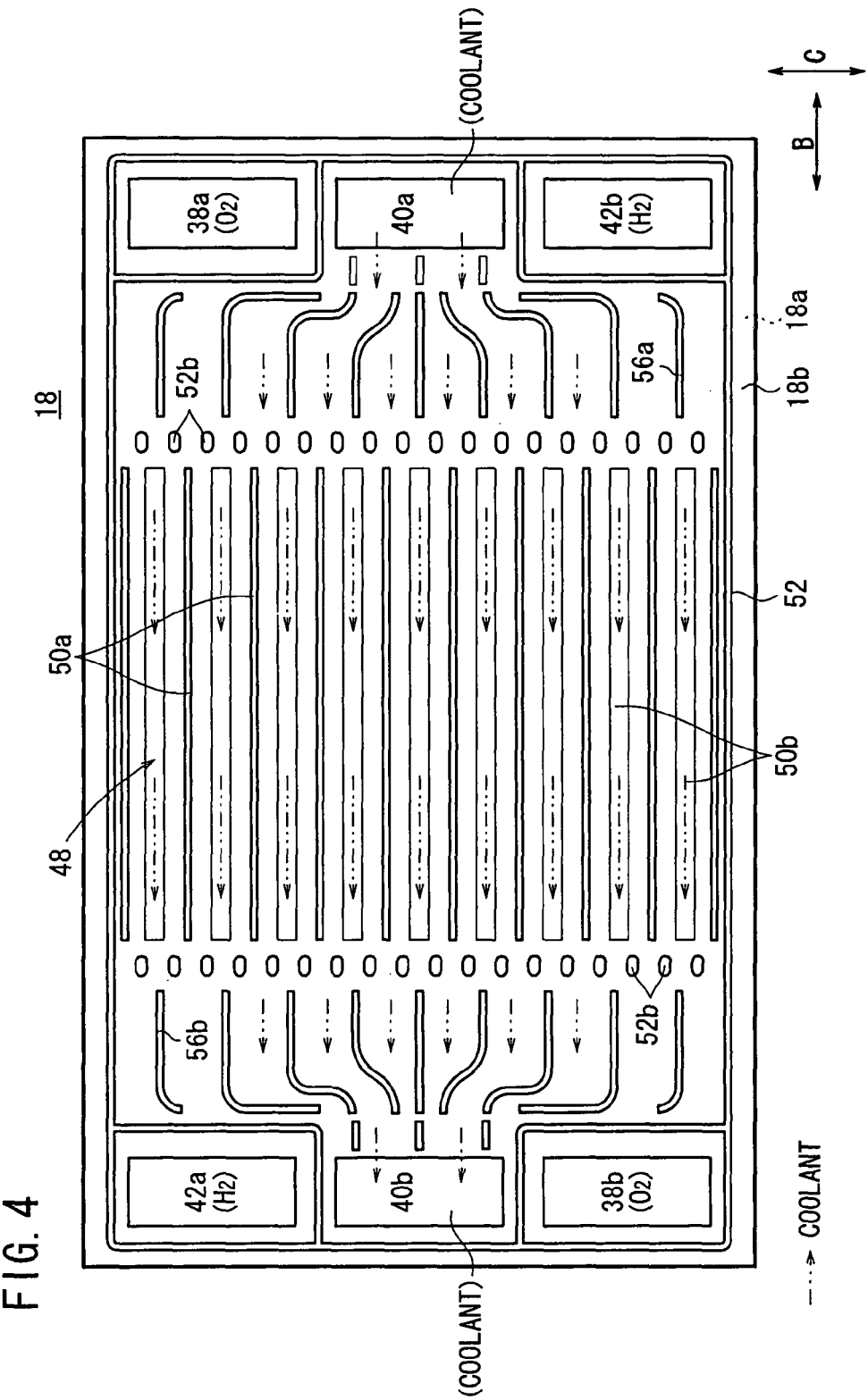
FIG. 4 is a view showing the other surface of the first metal separator.

As shown in FIG. 4, a coolant flow field 48 is formed on a surface 18b of the first metal separator 18 opposite to the surface 18a. The coolant flow field 48 is provided on the back surface of the first oxygen-containing gas flow field 44a. The coolant flow field 48 comprises a plurality of straight flow grooves 50b between straight ridges 50a. A seal member 52 is formed integrally on the surfaces 18a, 18b of the first metal separator 18.

As shown in FIG. 3, the seal member 52 is formed on the surface 18a of the first metal separator 18 such that the oxygen-containing gas supply passage 38a and the oxygen-containing gas discharge passage 38b are connected to the first oxygen-containing gas flow field 44a. Further, back support seals 52a are provided at opposite ends of the first oxygen-containing gas flow field 44a.

A plurality of guides 54a for guiding the oxygen-containing gas from the oxygen-containing gas supply passage 38a to the straight flow grooves 46b are provided between the oxygen-containing gas supply passage 38a and the first oxygen-containing flow field 44a. Further, a plurality of guides 54b for guiding the consumed oxygen-containing gas from the straight flow grooves 46b to the oxygen-containing gas discharge passage 38b are provided between the first oxygen-containing gas flow field 44a and the oxygen-containing gas discharge passage 38b. The guides 54a, 54b can be formed by molding at the time of molding the seal member 52 using the same material.

On the surface 18b, as shown in FIG. 4, the seal member 52 is provided such that the coolant supply passage 40a and the coolant discharge passage 40b are connected to the coolant flow field 48. Back support seals 52b are provided at opposite ends of the coolant flow field 48. A plurality of guides 56a, 56b for guiding the coolant are formed between the coolant supply passage 40a and the straight flow grooves 50b, and between the straight flow grooves 50b and the coolant discharge passage 40b, respectively. The guide 56a and the guide 56b are formed by molding at the time of molding the seal member 52 using the same material.

Figure 5:
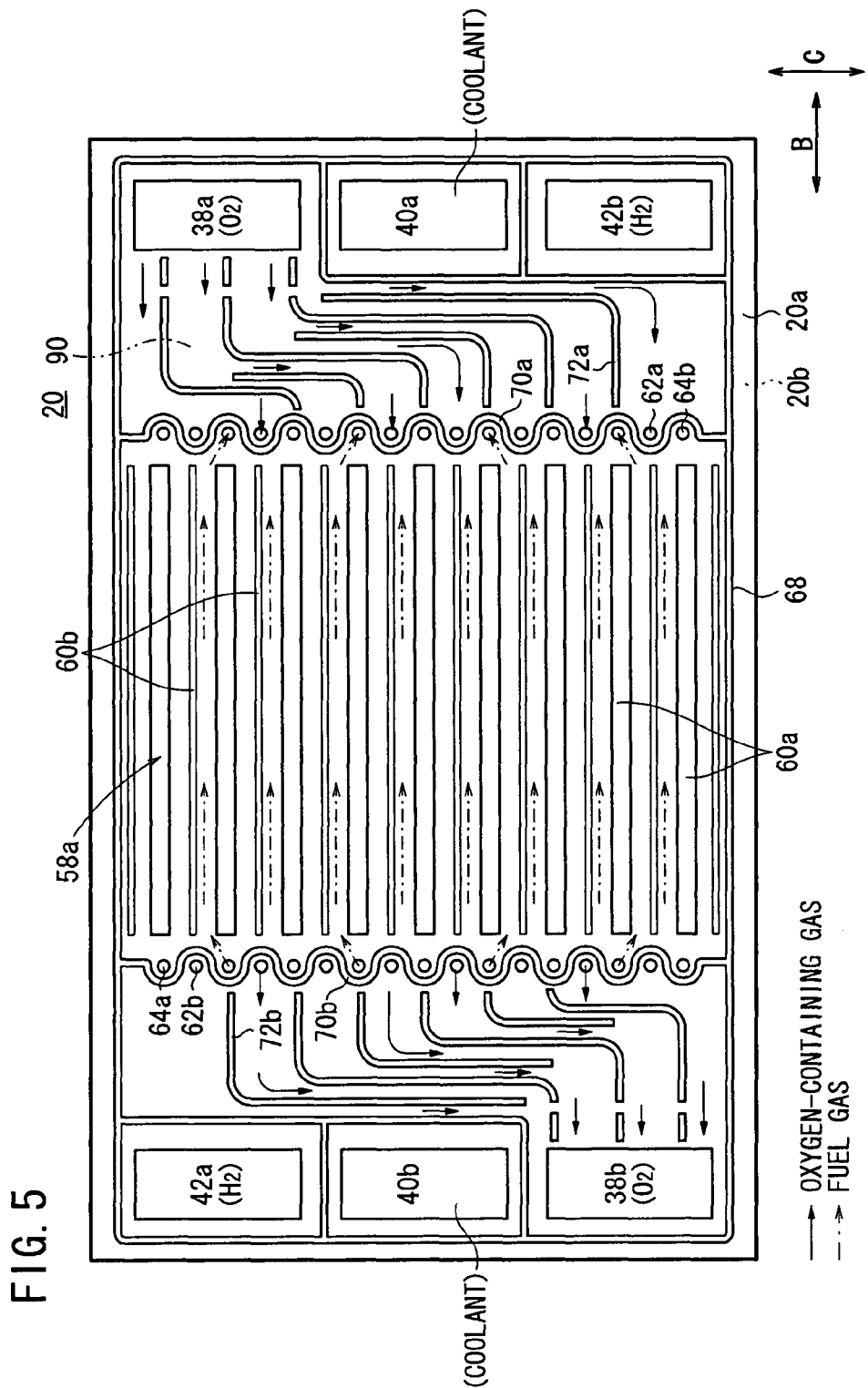
FIG. 5 is a view showing one surface of a second metal separator of the fuel cell stack.

As shown in FIG. 5, the second metal separator 20 has a first fuel gas flow field (third reactant gas flow field) 58a on its surface 20a facing the first membrane electrode assembly 16a. The first fuel gas flow field 58a comprises a plurality of straight flow grooves 60b extending in the direction indicated by the arrow B. The straight flow grooves 60b are formed between straight ridges 60a extending in the direction indicated by the arrow B. At opposite ends of the first fuel gas flow field 58a in the direction indicated by the arrow B, holes (openings) 62a, 62b as passages of the oxygen-containing gas are provided, and holes (openings) 64a, 64b as passages of the fuel gas are provided. The holes 62a and the holes 64b are arranged alternately in the direction indicated by the arrow C, and the holes 62b and the holes 64a are arranged alternately in the direction indicated by the arrow C.

Figure 6:
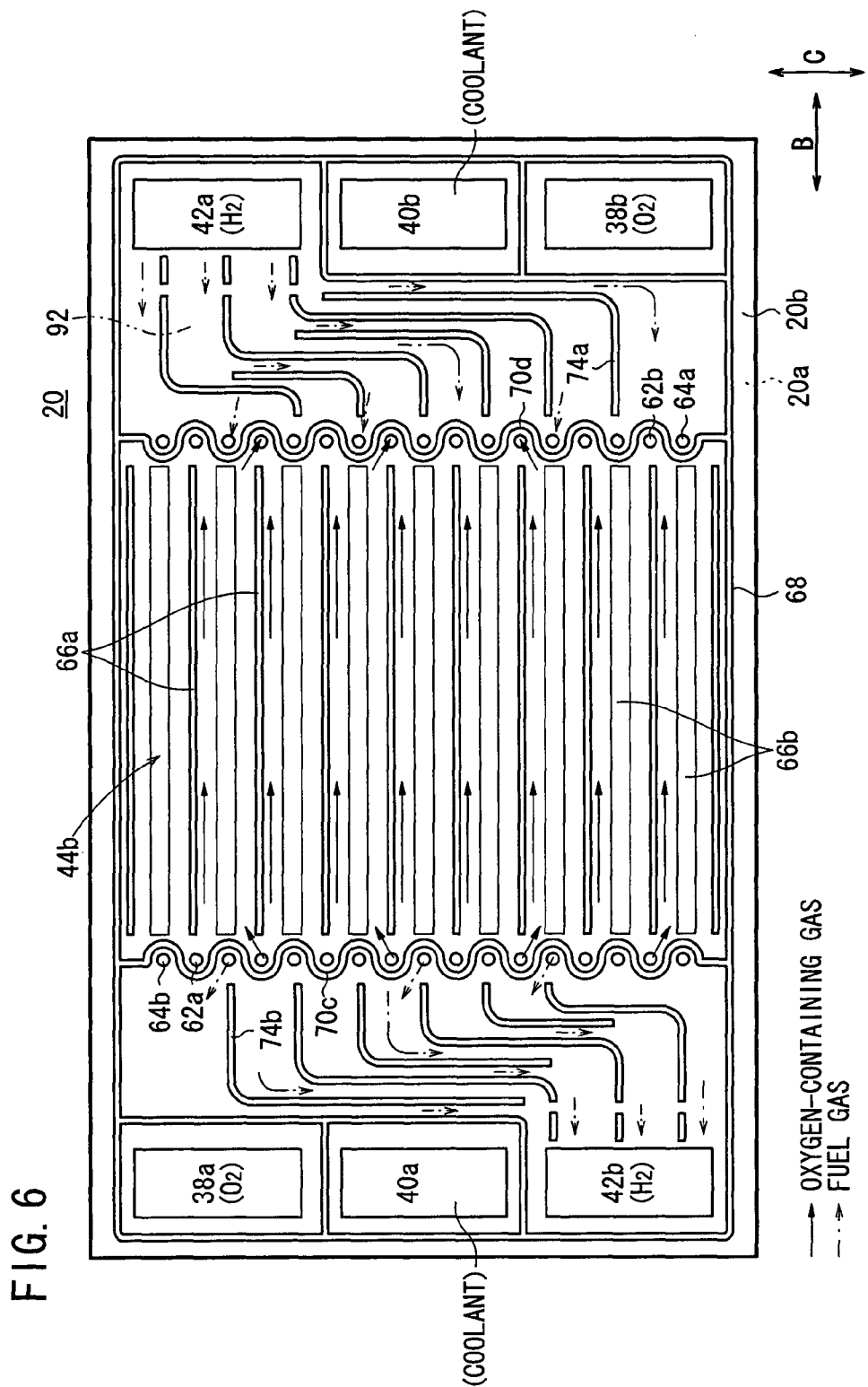
FIG. 6 is a view showing the other surface of the second metal separator.

As shown in FIG. 6, a second oxygen-containing gas flow field (second reactant gas flow field) 44b is formed on a surface 20b of the second metal separator 20. The second oxygen-containing gas flow field 44b comprises a plurality of straight flow grooves 66b extending in the direction indicated by the arrow B. The straight flow grooves 66b are formed between straight ridges 66a. A seal member 68 is formed integrally on the surfaces 20a, 20b of the second metal separator 20.

On the surface 20a, as shown in FIG. 5, the seal member 68 includes a serpentine seal 70a as a partition between the holes 62a and the holes 64b, and a serpentine seal 70b as a partition between the holes 62b and the holes 64a. The first fuel gas flow field 58a, and the holes 64a and the holes 64b are positioned in an area between the serpentine seals 70a, 70b. The oxygen-containing gas supply passage 38a is connected to the holes 62a and the oxygen-containing gas discharge passage 38b is connected to the holes 62b, outside the seals 70a, 70b. A plurality of guides 72a, 72b are provided between the oxygen-containing gas supply passage 38a and the holes 62a, and between the oxygen-containing gas discharge passage 38b and the holes 62b, respectively.

As shown in FIG. 6, on the surface 20b, a serpentine seal 70c as a partition between the holes 62a and the holes 64b and a serpentine seal 70d as a partition between the holes 62b and the holes 64a are provided. A plurality of guides 74a are provided between the fuel gas supply passage 42a and the holes 64a, and a plurality of guides 74b are provided between the fuel gas discharge passage 42b and the holes 64b.

Figure 7:
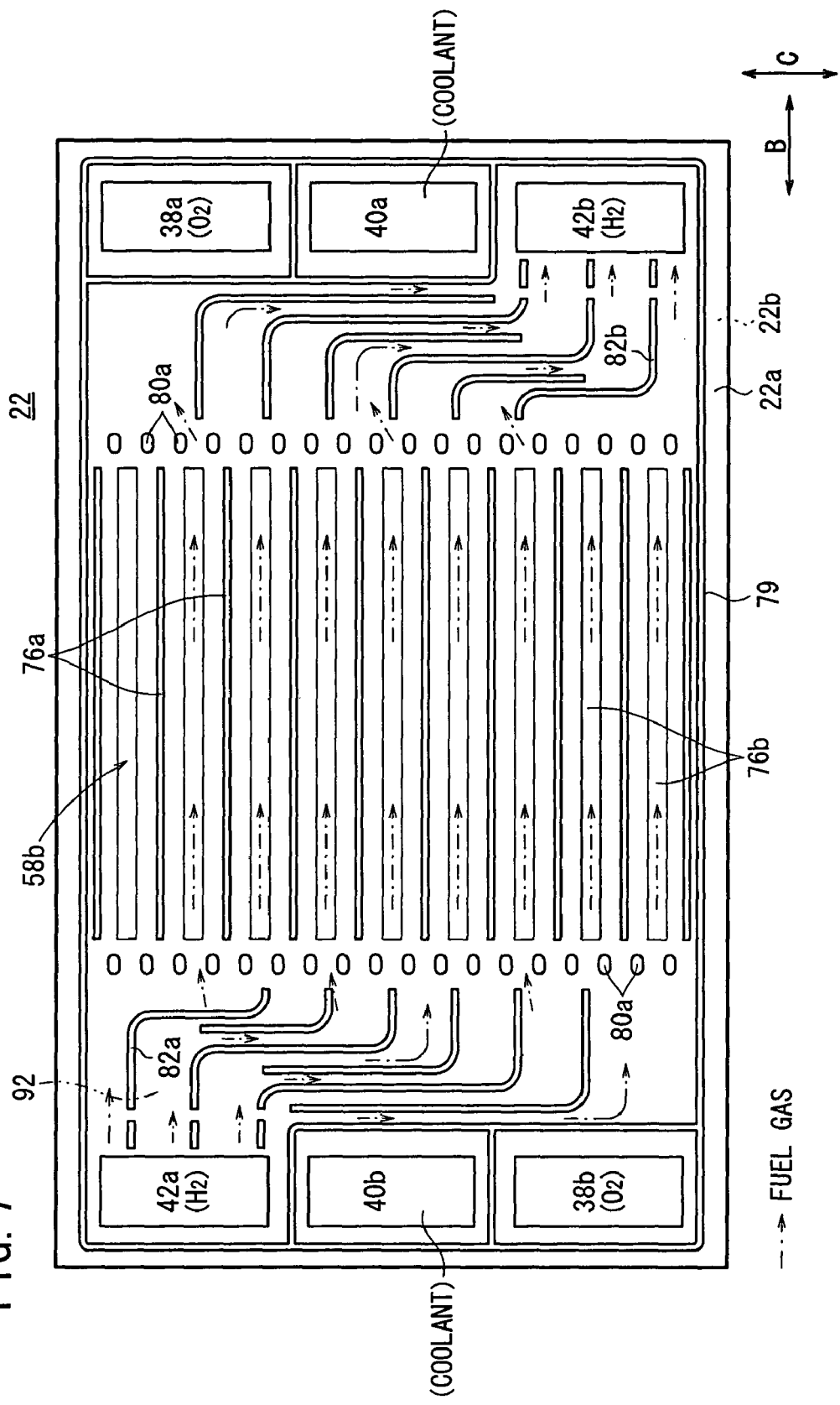
FIG. 7 is a view showing one surface of a third metal separator of the fuel cell stack.

As shown in FIG. 7, the third metal separator 22 has a second fuel gas flow field (fourth reactant gas flow field) 58b on its surface 22a facing the second membrane electrode assembly 16b. The second fuel gas flow field 58b comprises a plurality of straight flow grooves 76b extending straight in the direction indicated by the arrow B. The straight flow grooves 76b are formed between a plurality of straight ridges 76a.

Figure 8:
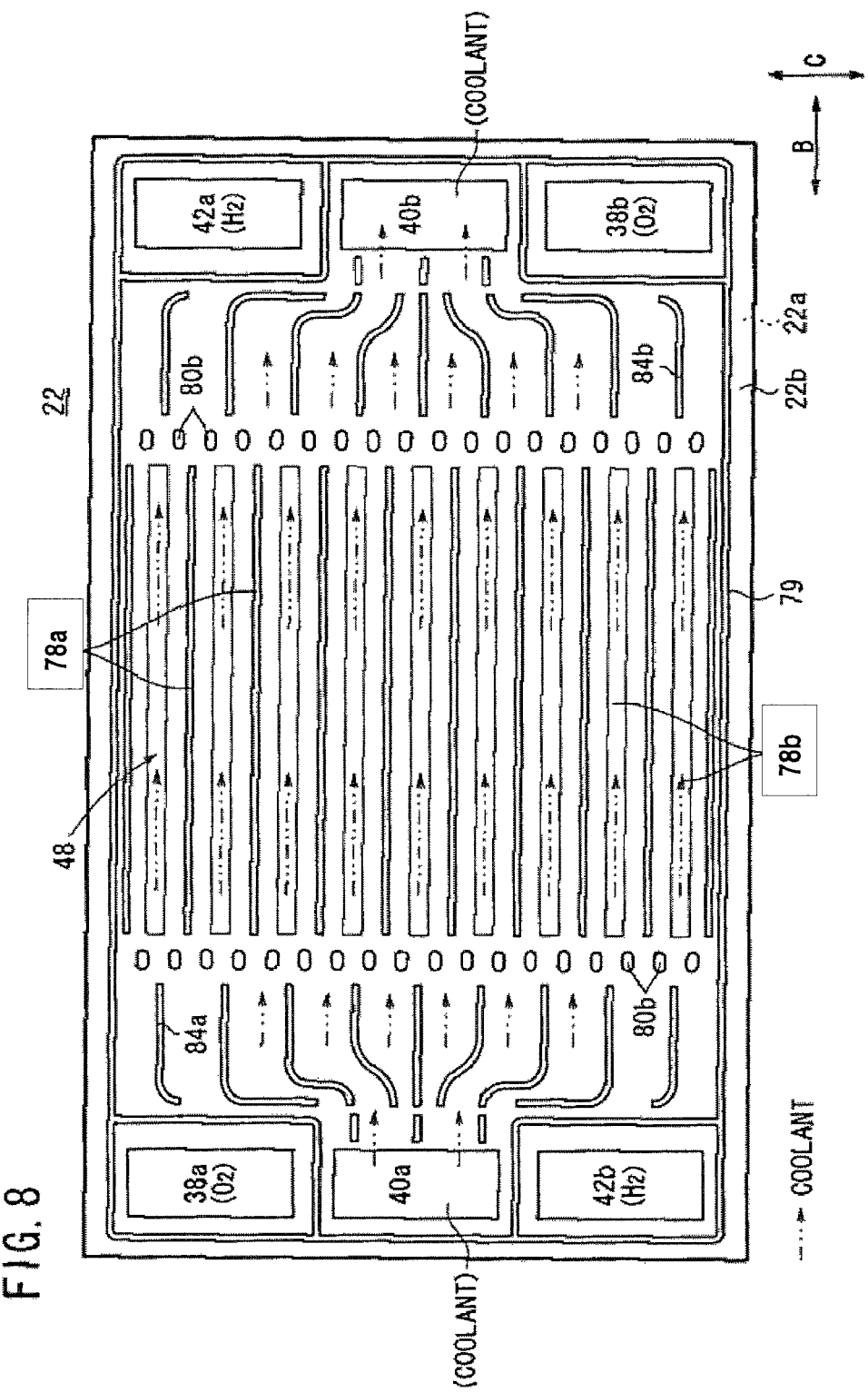
FIG. 8 is a view showing the other surface of the third metal separator.

In FIG. 8, the surface 22b of the third metal separator 22 and the surface 18b of the first metal separator 18 are overlapped with each other to form the coolant flow field 48. The coolant flow field 48 comprises a plurality of straight flow grooves 78b extending in the direction indicated by the arrow B. The straight flow grooves 78b are formed between a plurality of straight ridges 78a. A seal member 79 is integrally formed on the surfaces 22a, 22b of the third metal separator 22.

As shown in FIG. 7, on the surface 22a, back support seals 80a are provided at opposite ends of the second fuel gas flow field 58b, and as shown in FIG. 8, on the surface 22b, back support seals 80b are provided at opposite ends of the coolant flow field 48. On the surface 22a, a plurality of guides 82a, 82b for guiding the fuel gas is formed between the fuel gas supply passage 42a and the straight flow grooves 76b, and between the straight flow grooves 76b and the fuel gas discharge passage 42b, respectively. Likewise, on the surface 22b, a plurality of guides 84a, 84b for guiding the coolant are provided between the coolant supply passage 40a and the coolant flow field 48, and between the coolant flow field 48 and the coolant discharge passage 40b, respectively.

Figure 9:
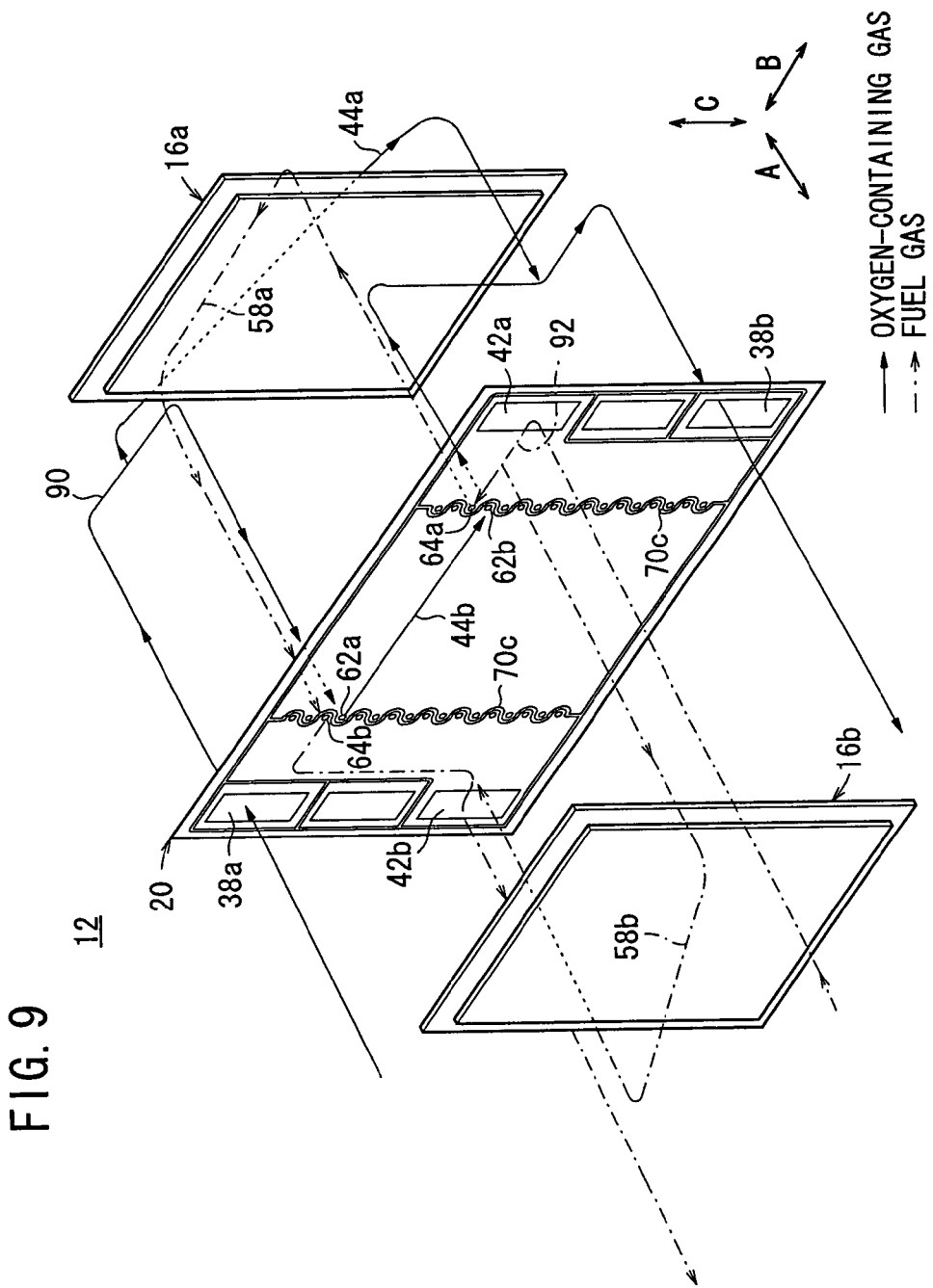
FIG. 9 is a view showing flows of reactant gases in a first cell module.

As shown in FIG. 2, an oxygen-containing gas distribution section 90 is formed between the first metal separator 18 and the second metal separator 20. The oxygen-containing gas distribution section 90 connects the oxygen-containing gas supply passage 38a to the first oxygen-containing gas flow field 44a. Further, the oxygen-containing gas distribution section 90 is connected to the second oxygen-containing gas flow field 44b through the holes 62a formed in the second metal separator 20 (see FIG. 9).

As shown in FIG. 1, a fuel gas distribution section 92 is formed between the second metal separator 20 and the third metal separator 22. The fuel gas distribution section 92 connects the fuel gas supply passage 42a to the second fuel gas flow field 58b. Further, the fuel gas distribution section 92 is connected to the first fuel gas flow field 58a through the holes 64a formed in the second metal separator 20 (see FIG. 9).

Next, operation of the fuel cell stack 10 will be described.

As shown in FIG. 1, in the first cell module 12, the oxygen-containing gas is supplied to the oxygen-containing gas supply passage 38a, and the fuel gas is supplied to the fuel gas supply passage 42a. Further, the coolant is supplied to the coolant supply passage 40a.

As shown in FIG. 2, the oxygen-containing gas is supplied from the oxygen-containing gas supply passage 38a into the oxygen-containing gas distribution section 90 formed between the first metal separator 18 and the second metal separator 20. The oxygen-containing gas distribution section 90 is connected to the first oxygen-containing gas flow field 44a through the guides 54a, 72a. The oxygen-containing gas is partially supplied from the guides 54a, 72a to the straight flow grooves 46b of the first oxygen-containing gas flow field 44a (see FIG. 3). Thus, the oxygen-containing gas flows through the straight flow grooves 46b along the cathode 32 of the first membrane electrode assembly 16a.

The oxygen-containing gas distribution section 90 is also connected to the second oxygen-containing gas flow field 44b through the holes 62a formed in the second metal separator 20. Therefore, the rest of the oxygen-containing gas supplied into the oxygen-containing gas distribution section 90 is supplied to the second oxygen-containing gas flow field 44b of the second metal separator 20 through the holes 62a, and flows through the straight flow grooves 66b along the cathode 32 of the second membrane electrode assembly 16b (see FIG. 6).

Further, as shown in FIG. 1, the fuel gas supplied to the fuel gas supply passage 42a flows into the fuel gas distribution section 92 formed between the second metal separator 20 and the third metal separator 22. The fuel gas distribution section 92 is connected to the second fuel gas flow field 58b, and connected to the first fuel gas flow field 58a through the holes 64a of the second metal separator 20 (see FIG. 9).

Thus, the fuel gas distributed to the fuel gas distribution section 92 is partially supplied to the second fuel gas flow field 58b, and the fuel gas flows along the anode 34 of the second membrane electrode assembly 16b. The rest of the fuel gas flows into the first fuel gas flow field 58a through the holes 64a and flows along the anode 34 of the first membrane electrode assembly 16a (see FIG. 5).

Thus, in each of the first membrane electrode assembly 16a and the second membrane electrode assembly 16b, the oxygen-containing gas supplied to the cathode 32, and the fuel gas supplied to the anode 34 are consumed in the electrochemical reactions at catalyst layers of the cathode 32 and the anode 34 for generating electricity.

Then, as shown in FIG. 3, the oxygen-containing gas supplied to the first oxygen-containing gas flow field 44a is guided by the guides 54b, 72b, and discharged into the oxygen-containing gas discharge passage 38b. The oxygen-containing gas supplied to the second oxygen-containing gas flow field 44b flows through the holes 62b of the second metal separator 20 toward the surface 18a of the first metal separator 18. The oxygen-containing gas from the holes 62b is merged with the oxygen-containing gas discharged from the first oxygen-containing gas flow field 44a, and then, discharged into the oxygen-containing gas discharge passage 38b.

The fuel gas supplied to the second fuel gas flow field 58b of the third metal separator 22 flows between the guides 82b, 74b, and is discharged into the fuel gas discharge passage 42b (see FIG. 7). The fuel gas supplied to the first fuel gas flow field 58a of the second metal separator 20 flows through the holes 64b toward the side of the second fuel gas flow field 58b, and then, the fuel gas from the holes 64b is merged with the consumed fuel gas discharged from the second fuel gas flow field 58b and discharged into the fuel gas discharge passage 42b (see FIG. 9).

As shown in FIG. 2, the coolant such as pure water and ethylene glycol is supplied into the coolant flow field 48 formed between the first cell module 12 and the second cell module 14, i.e., the third metal separator 22 and the fourth metal separator 24. The coolant flows in the direction indicated by the arrow B in FIG. 1. After the coolant cools the first membrane electrode assembly 16a to the fourth membrane electrode assembly 16d, the coolant is discharged into the coolant discharge passage 40b.

In the first embodiment, as shown in FIG. 2, the oxygen-containing gas distribution section 90 connected to the oxygen-containing gas supply passage 38a is formed between the first metal separator 18 and the second metal separator 20. The oxygen-containing gas distribution section 90 is directly connected to the first oxygen-containing gas flow field 44a through the space between the guides 54a, 72a, and connected to the second oxygen-containing gas flow field 44b through the holes 62a of the second metal separator 20.

Thus, the oxygen-containing gas supplied to the first oxygen-containing gas flow field 44a and the second oxygen-containing gas flow field 44b temporarily flows from the oxygen-containing gas supply passage 38a to the same oxygen-containing gas distribution section 90. In the structure, it is possible to achieve the sufficient flow field height (the dimension in the direction indicated by the arrow A) in the oxygen-containing gas distribution section 90 while suppressing the dimensions of the first cell module 12 and the second cell module 14 in the stacking direction. Thus, the oxygen-containing gas distribution section 90 can be designed freely, and the pressure loss in the oxygen-containing gas distribution section 90 is suppressed suitably.

The fuel gas distribution section 92 connected to the fuel gas supply passage 42a is formed between the second metal separator 20 and the third metal separator 22. The fuel gas distribution section 92 is connected: to the second fuel gas flow field 58b and the first fuel gas flow field 58a through the holes 64a of the second metal separator 20. Thus, the fuel gas supplied to the fuel gas supply passage 42a temporarily flows into the fuel gas distribution section 92, and then, the fuel gas is distributed to the anode 34 of the first membrane electrode assembly 16a and the anode 34 of the second membrane electrode assembly 16b. Therefore, the same advantages as in the case of the oxygen-containing gas distribution section 90 can be obtained.

Further, the guides 54a, 72a, and guides 54b, 72b are formed integrally at positions between the oxygen-containing gas supply passage 38a and the first oxygen-containing gas flow field 44a, and between the first oxygen-containing gas flow field 44a and the oxygen-containing gas discharge passage 38b. In the structure, in comparison with the case of structure having bosses, the pressure loss of the oxygen-containing gas is reduced effectively, and the flow field structure on both of front and back sides can be designed freely, and the fuel cell can be used in a variety of applications.

Figure 10:
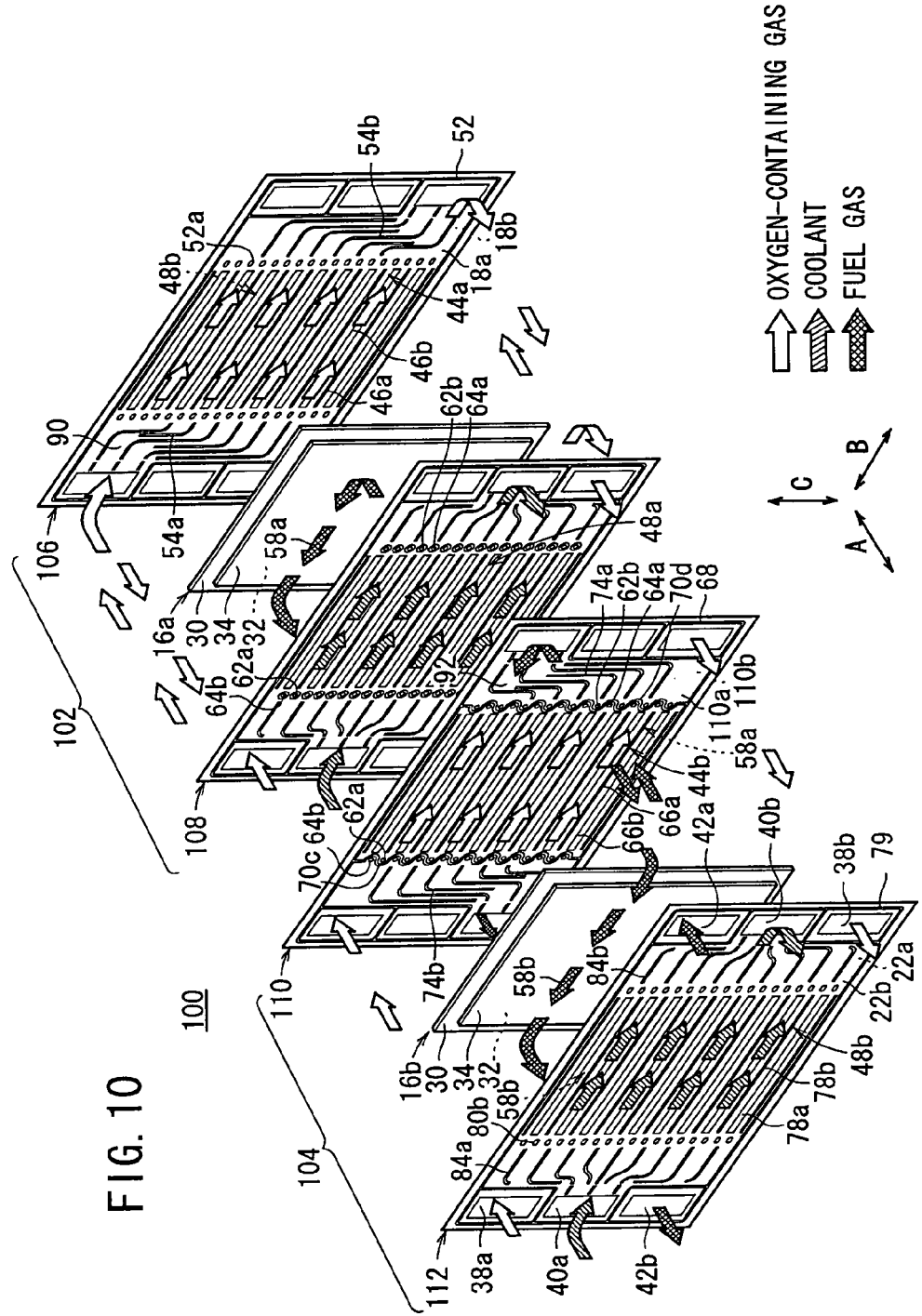
FIG. 10 is an exploded perspective view showing main components of a fuel cell stack according to a second embodiment of the present invention.
Figure 11:
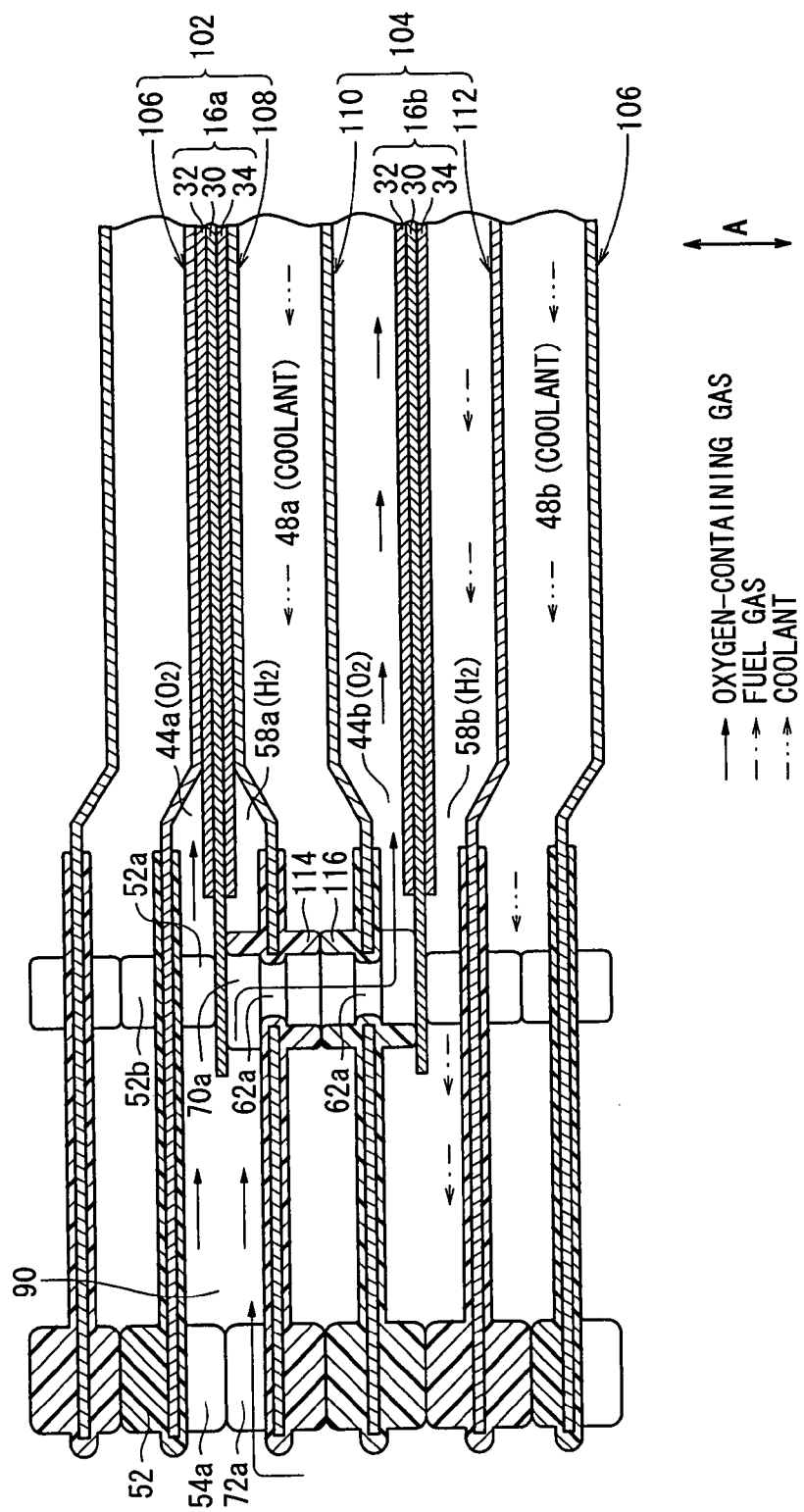
FIG. 11 is a partial cross sectional view showing the fuel cell stack.

FIG. 10 is an exploded perspective view showing main components of a fuel cell stack 100 according to a second embodiment of the present invention. FIG. 11 is a partial cross sectional view showing the fuel cell stack 100. The constituent elements of the fuel cell stack 10 according to the first embodiment are labeled with the same reference numerals, and detailed description will be omitted.

The fuel cell stack 100 is formed by stacking first fuel cells 102 and second fuel cells 104 alternately in the direction indicated by an arrow A. The first fuel cell 102 includes a first membrane electrode assembly 16a, and a first metal separator 106 and a second metal separator 108 sandwiching the first membrane electrode assembly 16a. The second fuel cell 104 includes a second membrane electrode assembly 16b, and a third metal separator 110 and a fourth metal separator 112 sandwiching the second membrane electrode assembly 16b.

The first metal separator 106 is the same as the first metal separator 18 of the fuel cell stack 10 according to the first embodiment, and the fourth metal separator 112 is the same as the sixth metal separator 28 (substantially the same as the third metal separator 22), and detailed description of the first metal separator 106 and the fourth metal separator 112 is omitted.

Figure 12:
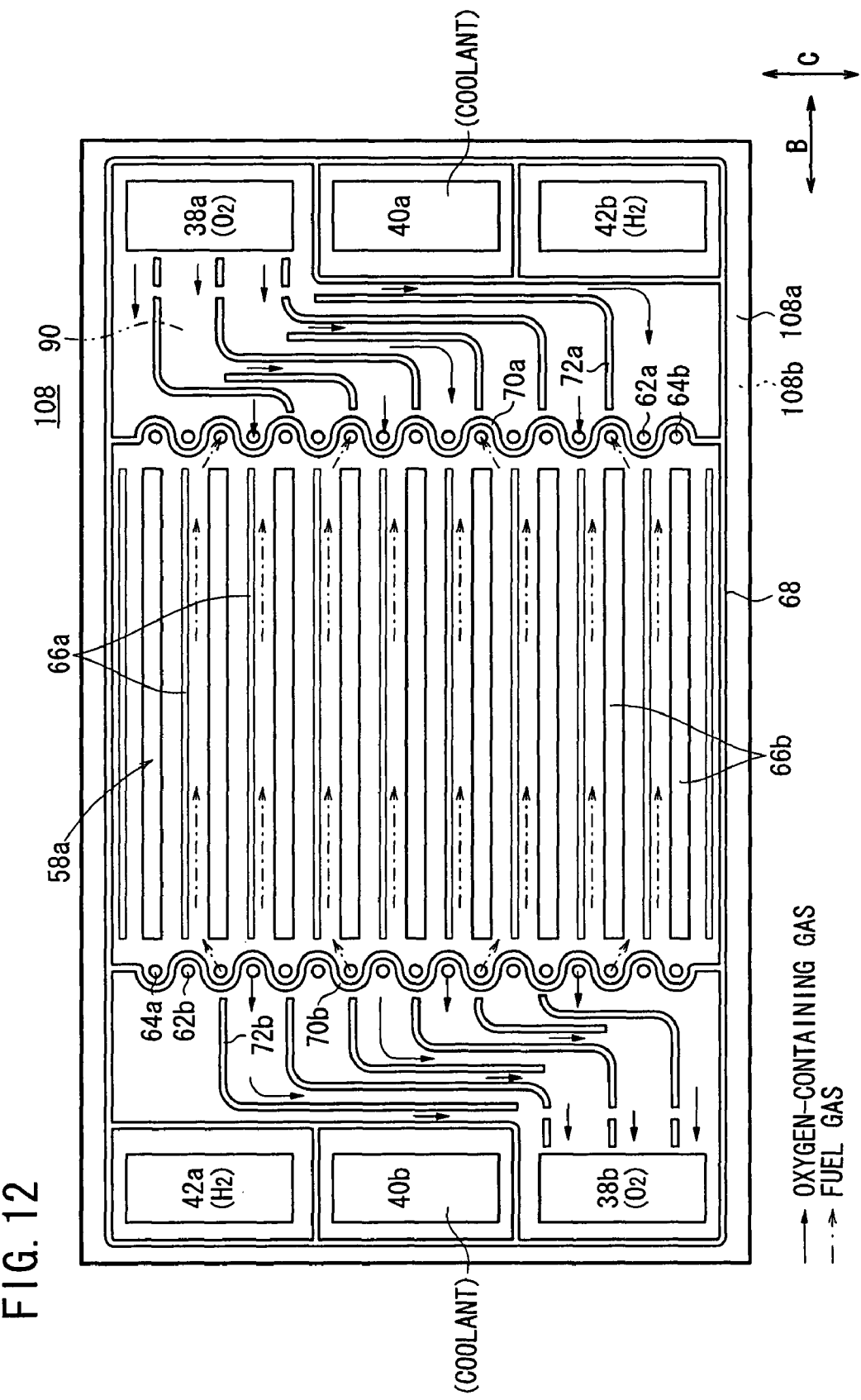
FIG. 12 is a view showing one surface of a second metal separator of the fuel cell stack.
Figure 13:
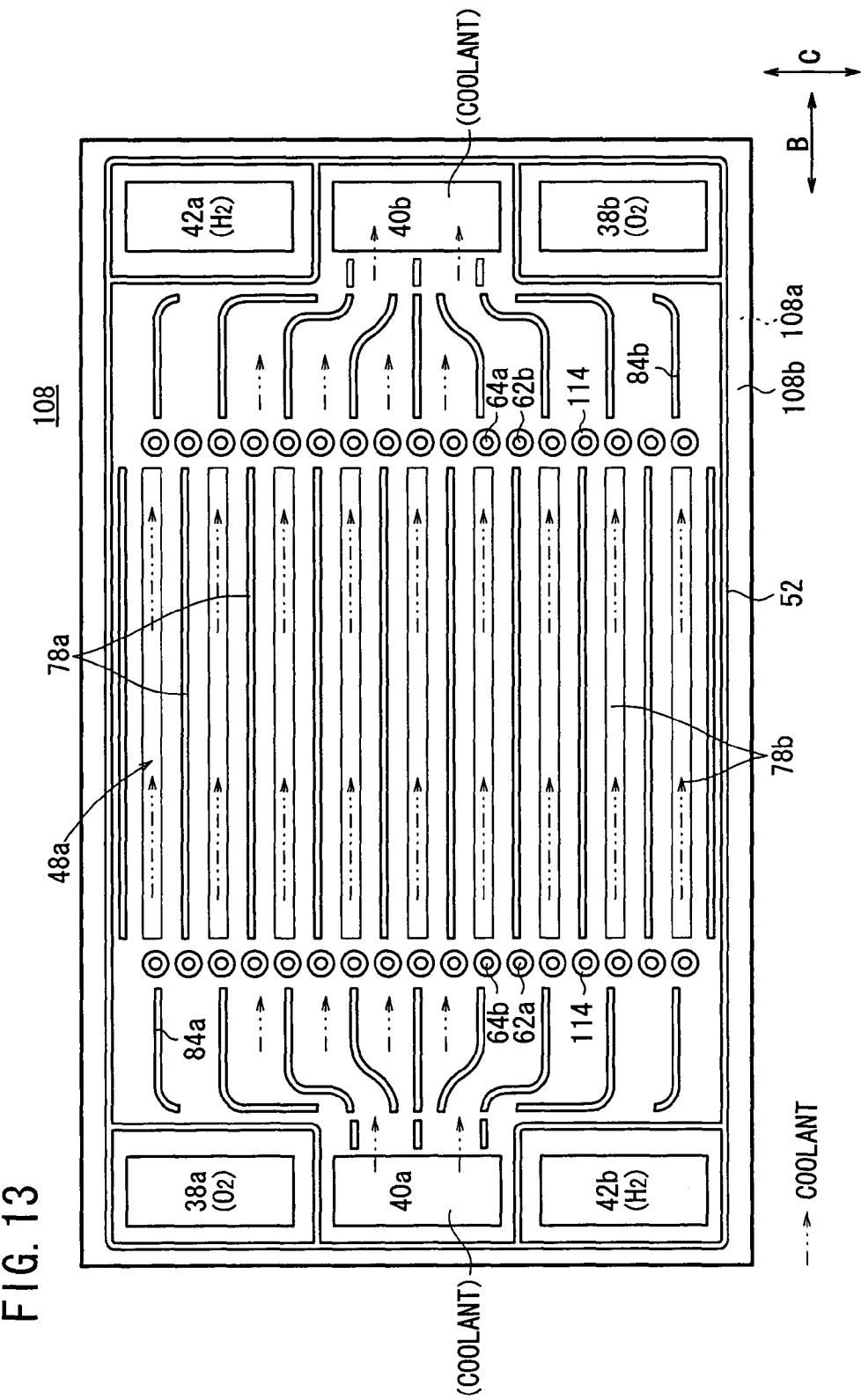
FIG. 13 is a view showing the other surface of the second metal separator.

As shown in FIG. 12, the second metal separator 108 has a first fuel gas flow field 58a on its surface 108a facing the first membrane electrode assembly 16a. As shown in FIG. 13, a first coolant flow field 48a is formed on a surface 108b of the second metal separator 108. The first coolant flow field 48a is connected to the coolant supply passage 40a and the coolant discharge passage 40b through the guides 84a, 84b.

At one end of the first coolant flow field 48a in a direction indicated by an arrow B, holes 62a, 64b are arranged alternately in a direction indicated by an arrow C. At the other end of the first coolant flow field 48a in the direction indicated by the arrow B, holes 62b, 64a are arranged alternately in the direction indicated by the arrow C. The holes 62a, 62b, 64a, 64b are surrounded by circular seals 114.

Figure 14:
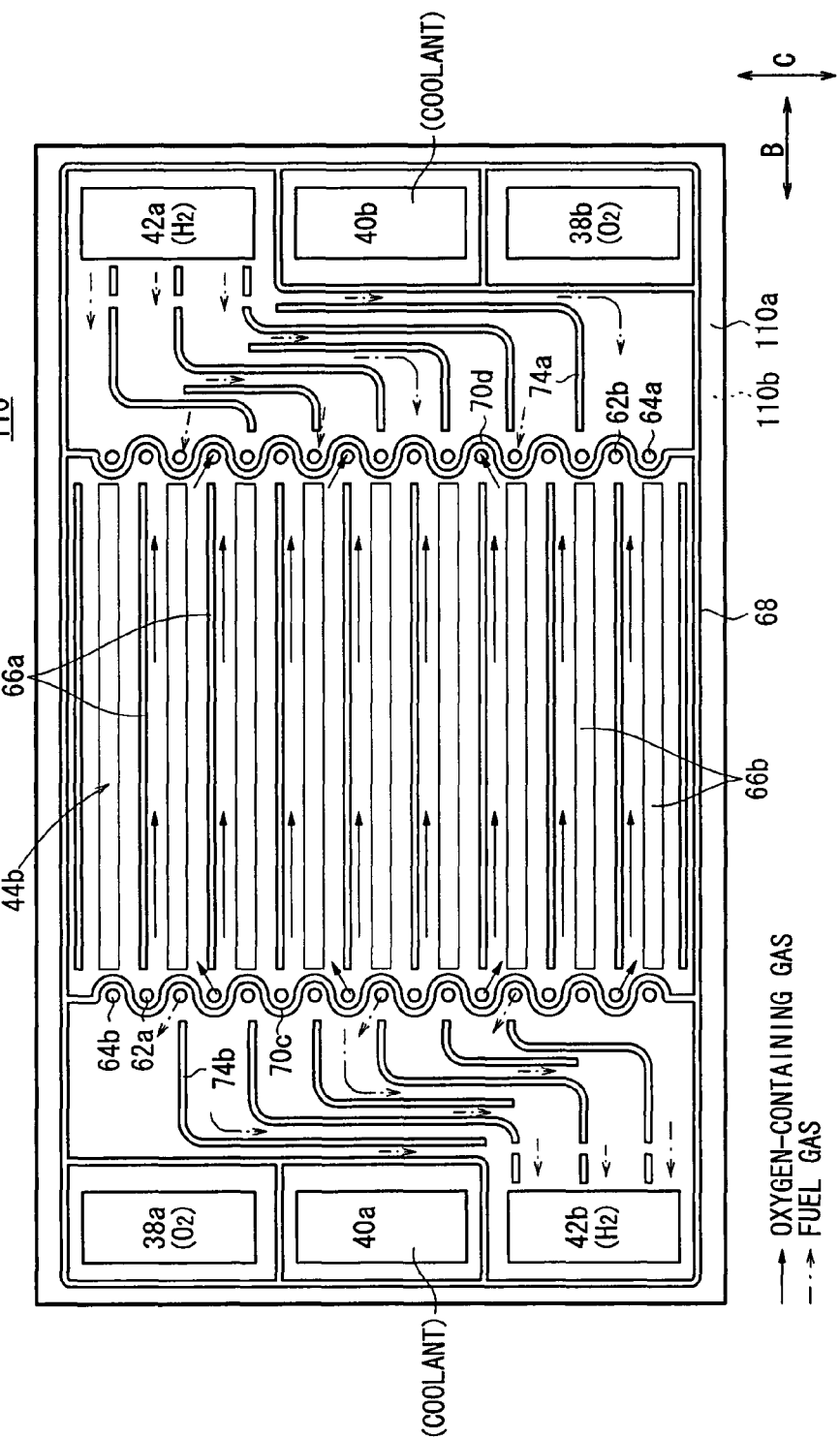
FIG. 14 is a view showing one surface of a third metal separator of the fuel cell stack.

As shown in FIG. 14, the third metal separator 110 has a second oxygen-containing gas flow field 44b on its surface 110a facing the second membrane electrode assembly 16b of the third metal separator 110. On the surface 110a, the fuel gas supply passage 42a is connected to the holes 64a through the guides 74a, and the fuel gas discharge passage 42b is connected to the holes 64b through the guides 74b.

Figure 15:
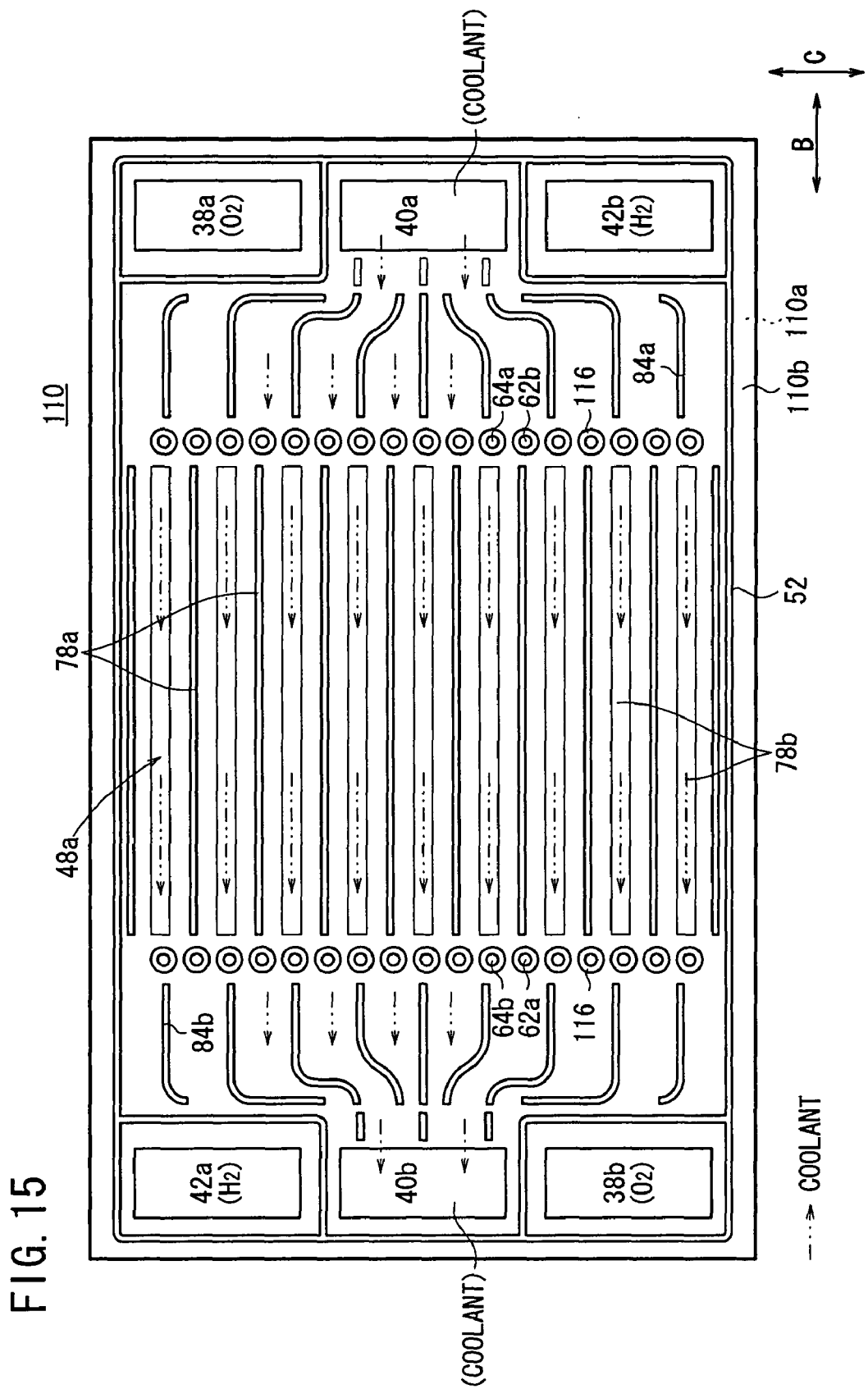
FIG. 15 is a view showing the other surface of the third metal separator.

As shown in FIG. 15, a surface 110b of the third metal separator 110 and a surface 108b of the second metal separator 108 are overlapped with each other to form the first coolant flow field 48a. On the surface 110b, circular seals 116 are formed around the holes 62a, 62b, 64a, 64b.

As shown in FIGS. 10 and 11, a second coolant flow field 48b is formed between the fourth metal separator 112 and the first metal separator 106. The oxygen-containing gas distribution section 90 is formed between the first metal separator 106 and the second metal separator 108. The oxygen-containing gas distribution section 90 connects the oxygen-containing gas supply passage 38a to the first oxygen-containing flow field 44a. Further, the oxygen-containing gas distribution section 90 is connected to the second oxygen-containing gas flow field 44b through the holes 62a of the second metal separator 108 and the third metal separator 110.

Figure 16:
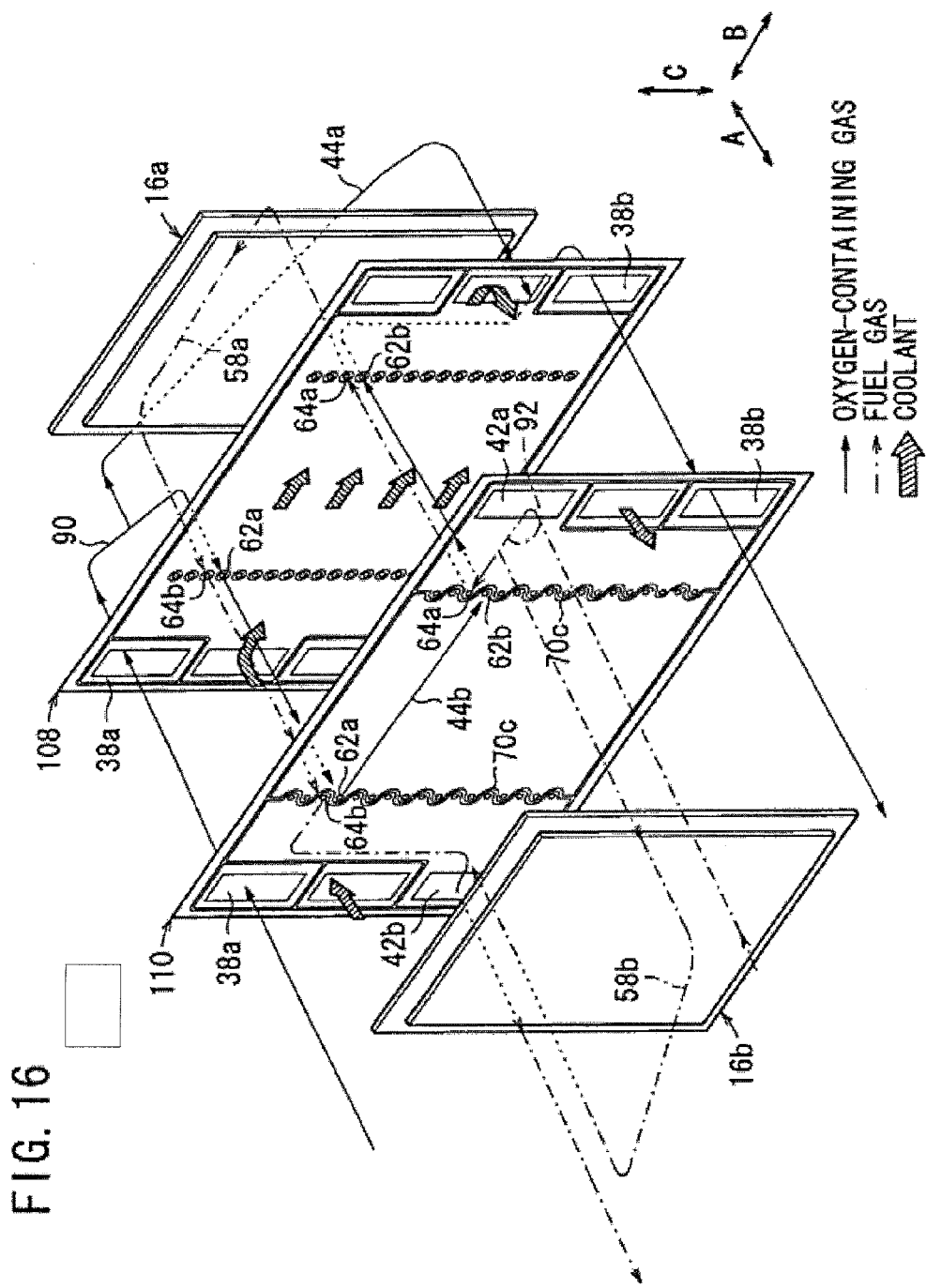
FIG. 16 is a view showing flows of reactant gases in a first fuel cell.
Figure 17:
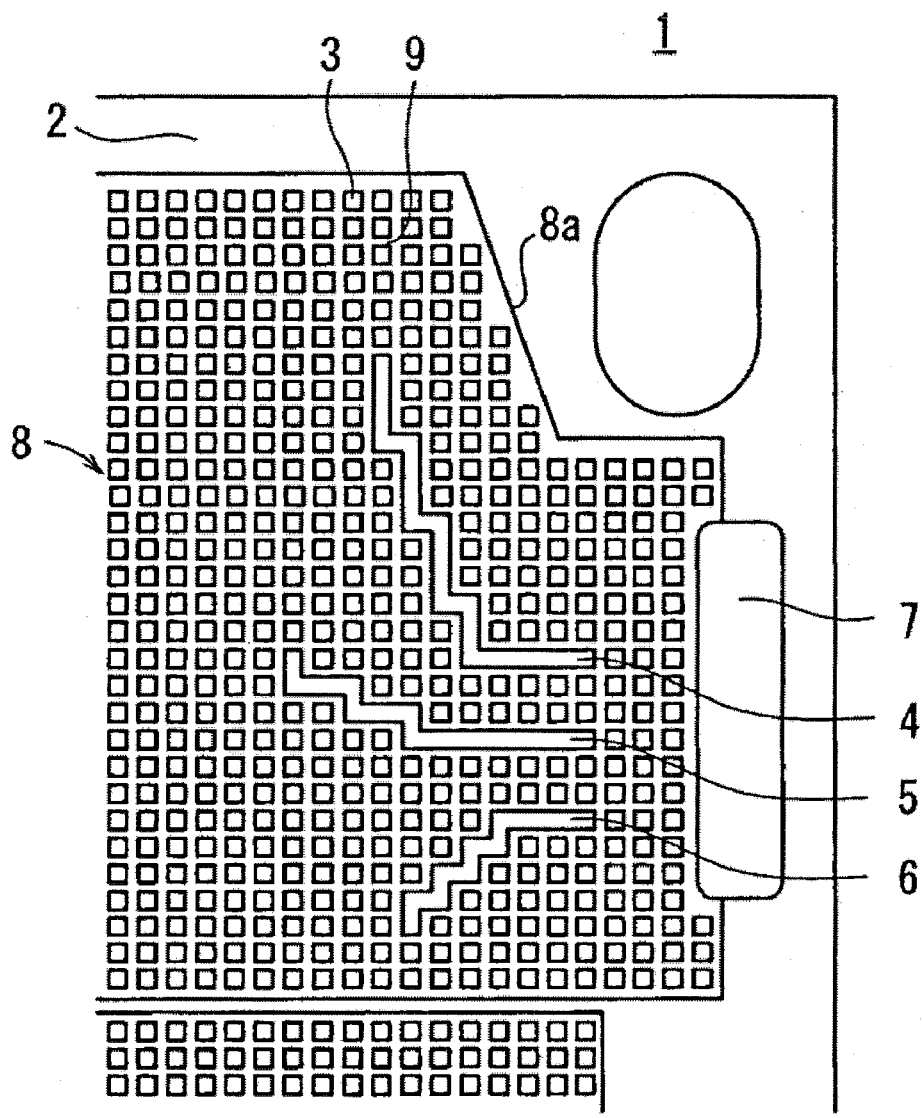
FIG. 17 is a view showing part of a separator of a conventional fuel cell.

The fuel gas distribution section 92 is formed between the third metal separator 110 and the fourth metal separator 112. The fuel gas distribution section 92 connects the fuel gas supply passage 42a to the second fuel gas flow field 58b. Further, the fuel gas distribution section 92 is connected to the first fuel gas flow field 58a through the holes 64a of the second metal separator 108 and the third metal separator 110 (see FIG. 16).

In the second embodiment, as shown in FIGS. 10 and 11, the oxygen-containing gas supplied to the oxygen-containing gas supply passage 38a flows into the oxygen-containing gas distribution section 90 formed between the first metal separator 106 and the second metal separator 108 of the first fuel cell 102. The oxygen-containing gas flows through the first oxygen-containing gas flow field 44a connected to the oxygen-containing gas distribution section 90 along the cathode 32 of the first membrane electrode assembly 16a.

The oxygen-containing gas distribution section 90 is connected to the second oxygen-containing gas flow field 44b through the holes 62a of the second metal separator 108 and the third metal separator 110. Thus, the oxygen-containing gas supplied to the oxygen-containing gas distribution section 90 partially flows through the holes 62a, and then, the oxygen-containing gas flows through the second oxygen-containing gas flow field 44b along the cathode 32 of the second membrane electrode assembly 16b. At this time, the circular seals 114, 116 of the second metal separator 108 and the third metal separator 110 tightly contact each other on the side of the first coolant flow field 48a to prevent the leakage of the oxygen-containing gas.

The fuel gas supplied to the fuel gas supply passage 42a is supplied to the fuel gas distribution section 92 formed between the third metal separator 110 and the fourth metal separator 112 of the second fuel cell 104. The fuel gas supplied to the fuel gas distribution section 92 partially flows through the second fuel gas flow field 58b along the anode 34 of the second membrane electrode assembly 16b. The rest of the fuel gas supplied to the fuel gas distribution section 92 flows through the holes 64a of the second metal separator 108 and the third metal separator 110, and then, the fuel gas flows through the first fuel gas flow field 58a of the first fuel cell 102 along the anode 34 of the first membrane electrode assembly 16a.

In the second embodiment, the oxygen-containing gas supplied to the oxygen-containing gas supply passage 38a is temporarily supplied to the oxygen-containing gas distribution section 90, and then, distributed into the first oxygen-containing gas flow field 44a and the second oxygen-containing gas flow field 44b. Likewise, the fuel gas supplied to the fuel gas supply passage 42a is temporarily supplied to the fuel gas distribution section 92, and then, distributed into the first fuel gas flow field 58a and the second fuel gas flow field 58b. Thus, in the second embodiment, the same advantages as in the case of the first embodiment can be obtained.

While the invention has been particularly shown and described with reference to the preferred embodiments, it will be understood that variations and modifications can be effected thereto by those skilled in the art without departing from the spirit and scope of the invention as defined by the appended claims.

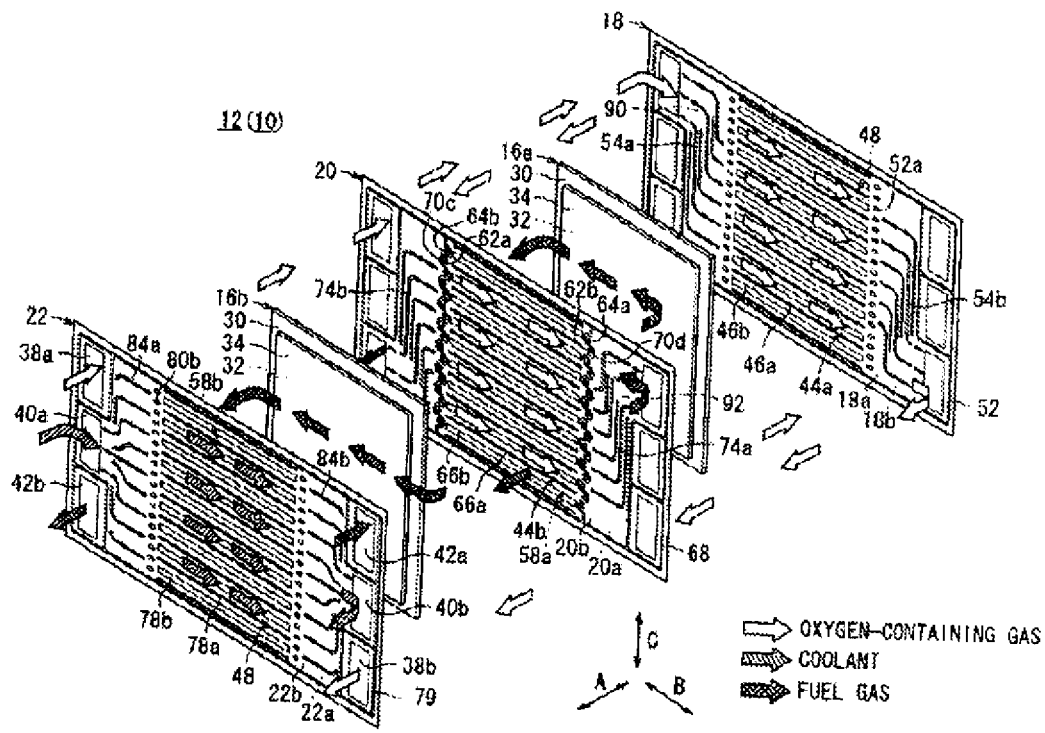

What is claimed is:

1. A fuel cell stack formed by stacking a first electrolyte electrode assembly, a second electrolyte electrode assembly, and a plurality of separators alternately in a stacking direction, said first electrolyte electrode assembly and said second electrolyte electrode assembly each comprising a pair of electrodes and an electrolyte interposed between said electrodes, said plurality of separators comprising a first reactant gas passage as a passage of a first reactant gas and a second reactant gas passage as a passage of a second reactant gas, which is different from the first reactant gas, extending through said plurality of separators in the stacking direction, said fuel cell stack comprising:

a first reactant flow field for supplying the first reactant gas along a first electrode surface of said first electrolyte electrode assembly; and a second reactant gas flow field for supplying the first reactant gas along a first electrode surface of said second electrolyte electrode assembly, wherein two of said plurality of separators sandwich said first electrolyte electrode assembly;

one of said plurality of separators is adjacent to said second electrolyte electrode assembly;

a first reactant gas distribution section connecting said first reactant gas flow field to said first reactant gas passage is formed between the two separators sandwiching said first electrolyte electrode assembly, wherein the first reactant gas distribution section is located between the first reactant gas passage and the first reactant gas flow field, and extends along a surface of the separator having the first electrode surface in a direction perpendicular to the stacking direction of the fuel cell stack; and the separator adjacent to said second electrolyte electrode assembly has a first opening for passing the first reactant gas therethrough such that said second reactant gas flow field is connected to said first reactant gas distribution section, wherein the first reactant gas distribution section connects to the first reactant gas passage at a first end and connects to the first reactant gas flow field at a second end, the first reactant gas flow field extends along a surface of the separator in a first direction; and the first opening extends through a surface of the separator adjacent to the second electrolyte electrode assembly in the stacking direction, and is provided at the second end of the first reactant gas distribution section between the first reactant gas flow field and the first reactant gas passage in the first direction along the surface of the separator that includes the first reactant gas flow field.

2. A fuel cell stack according to claim 1, further comprising a third reactant gas flow field for supplying the second reactant gas along a second electrode surface of said first electrolyte electrode assembly, and a fourth reactant gas flow field for supplying the second reactant gas along a second electrode surface of said second electrolyte electrode assembly, wherein two of said plurality of separators sandwich said second electrolyte electrode assembly;

one of said plurality of separators is adjacent to said first electrolyte electrode assembly;

a second reactant gas distribution section connecting said fourth reactant gas flow field to said second reactant gas passage is formed between the two separators sandwiching said second electrolyte electrode assembly; and one of the separators adjacent to said first electrolyte electrode assembly has a second opening for passing the second reactant gas therethrough such that said third reactant gas flow field is connected to said second reactant gas distribution section.

3. A fuel cell stack according to claim 2, wherein an interposed separator from among the plurality of separators is interposed between said first electrolyte electrode assembly and said second electrolyte electrode assembly; and said interposed separator has said first opening for passing the first reactant gas therethrough, said second opening for passing the second reactant gas therethrough, and a seal member as a partition between said first opening for passing the first reactant gas and said second opening for passing the second reactant gas.

4. A fuel cell stack according to claim 3, wherein said first opening for passing the first reactant gas and said second opening for passing the second reactant gas each comprise a plurality of holes.

* * * * *

UNITED STATES PATENT AND TRADEMARK OFFICE
CERTIFICATE OF CORRECTION

PATENT NO. : 8,268,503 B2
APPLICATION NO. : 11/789879
DATED : September 18, 2012
INVENTOR(S) : Kentaro Ishida et al.

Page 1 of 4

It is certified that error appears in the above-identified patent and that said Letters Patent is hereby corrected as shown below:

On the Title Page

Delete Title Page and replace with new Title Page. (Attached)

In the Drawings

Delete Fig. 1, and replace with new figure as shown.

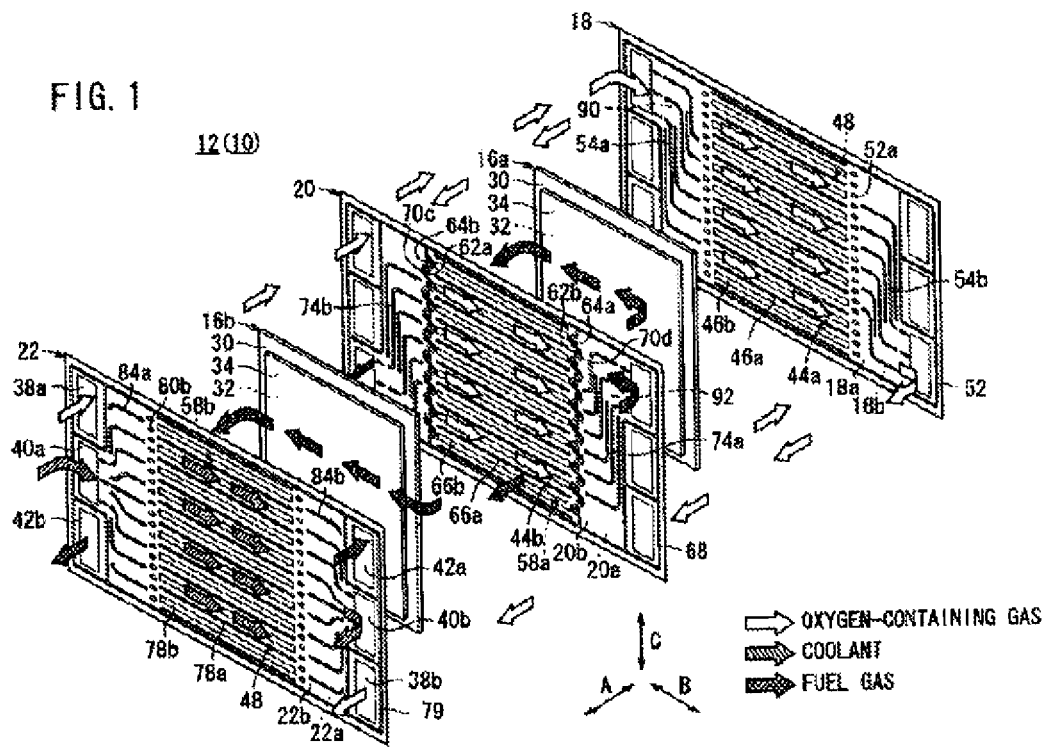

Signed and Sealed this
Eleventh Day of March, 2014

Michelle K. Lee
*Deputy Director of the United States Patent and Trademark Office*

Delete Fig. 3, and replace with new figure as shown.
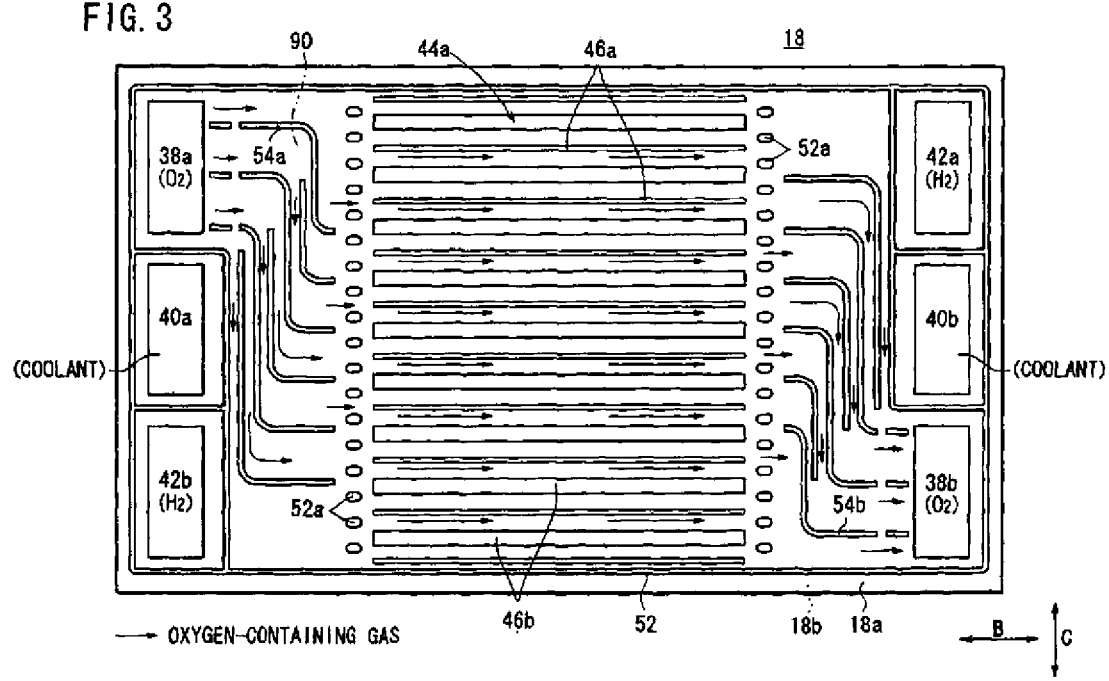
Delete Fig. 5, and replace with new figure as shown.
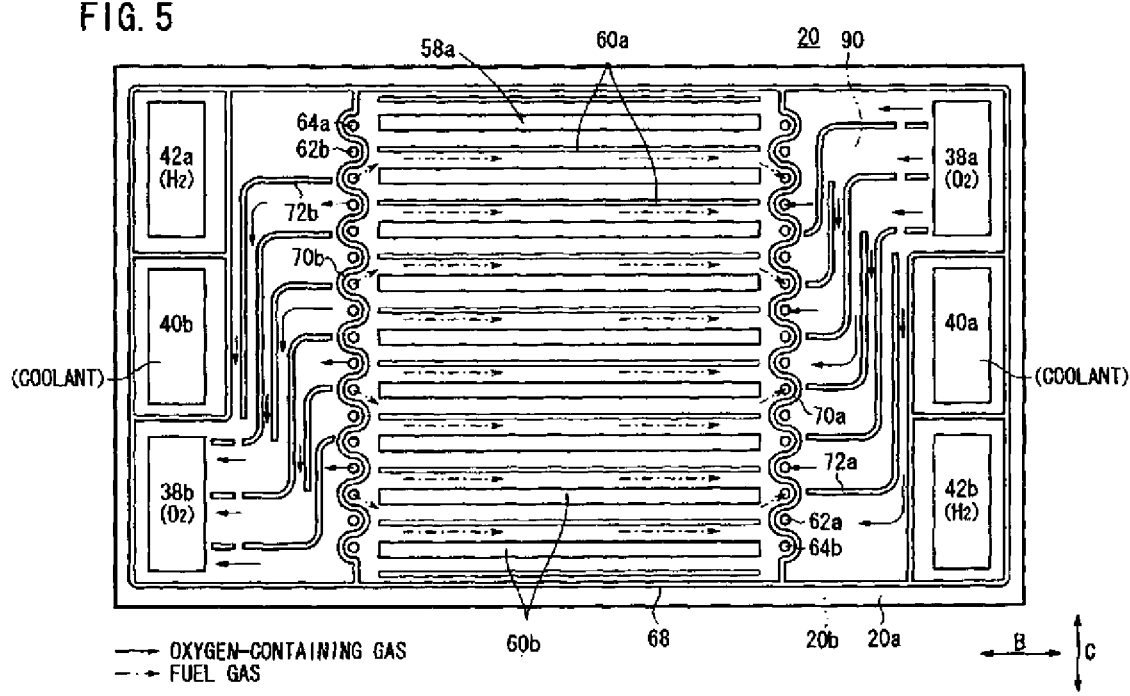

Delete Fig. 10, and replace with new figure as shown.
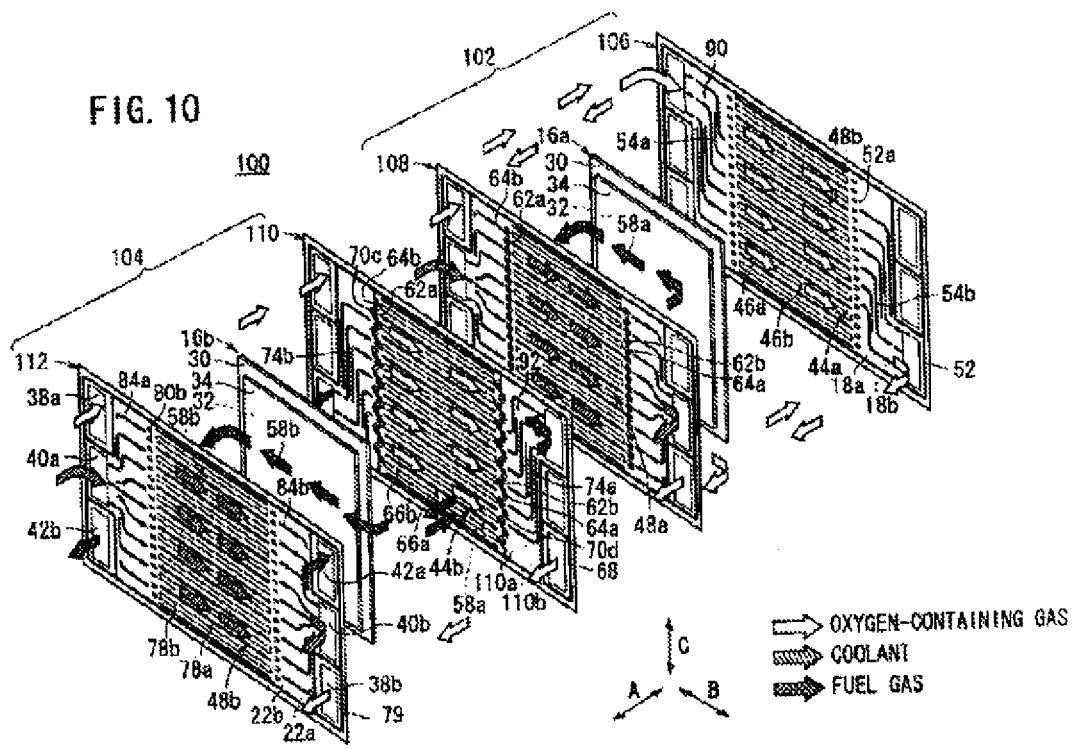

(12) United States Patent
Ishida et al.

(10) Patent No.: US 8,268,503 B2
(45) Date of Patent: Sep. 18, 2012

(54) FUEL CELL STACK

(75) Inventors: Kentaro Ishida, Shioya-gun (JP); Seiji Sugiura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1136 days.

(21) Appl. No.: 11/789,879

(22) Filed: Apr. 26, 2007

(65) Prior Publication Data
US 2007/0254203 A1 Nov. 1, 2007

(30) Foreign Application Priority Data
Apr. 28, 2006 (JP) ................... 2006-126355

(51) Int. Cl.
H01M 2/38 (2006.01)
H01M 2/40 (2006.01)
H01M 8/24 (2006.01)
H01M 8/04 (2006.01)

(52) U.S. Cl. .................. 429/457; 429/458; 429/514

(58) Field of Classification Search .............. 429/457, 429/458, 514
See application file for complete search history.

(56) References Cited

U.S. PATENT DOCUMENTS
2005/0095474 A1* 5/2005 Rainville ................ 429/22
2005/0277013 A1* 12/2005 Yamaga et al. ........... 429/38

FOREIGN PATENT DOCUMENTS
JP 2003-077497 3/2003

* cited by examiner

Primary Examiner — Eugenia Wang
(74) Attorney, Agent, or Firm — Nelson Mullins Riley & Scarborough LLP; Anthony A. Laurentano

(57) ABSTRACT

In a fuel cell module, a first membrane electrode assembly is sandwiched between a first metal separator and a second metal separator, and a second membrane electrode assembly is sandwiched between the second metal separator and the third metal separator. An oxygen-containing gas distribution section connected to a first oxygen-containing gas flow field is formed between the first metal separator and the second metal separator. The second metal separator has holes connecting the oxygen-containing gas distribution section to a second oxygen-containing gas flow field.

4 Claims, 17 Drawing Sheets